(12) United States Patent
Duffield et al.

(10) Patent No.: US 7,746,808 B2
(45) Date of Patent: Jun. 29, 2010

(54) ALGORITHMS AND ESTIMATORS FOR SUMMARIZATION OF UNAGGREGATED DATA STREAMS

(75) Inventors: Nicholas Duffield, Summit, NJ (US);
Edith Cohen, Berkeley Heights, NJ (US); Haim Kaplan, Hod Hasharon (IL); Carsten Lund, Berkeley Heights, NJ (US); Mikkel Thorup, Florence, MA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 107 days.

(21) Appl. No.: 12/136,725

(22) Filed: Jun. 10, 2008

(65) Prior Publication Data

US 2009/0303901 A1  Dec. 10, 2009

(51) Int. Cl.
*H04L 12/26* (2006.01)
(52) U.S. Cl. ..................................... 370/253
(58) Field of Classification Search ........................ None
See application file for complete search history.

(56) References Cited

U.S. PATENT DOCUMENTS

| | | | |
|---|---|---|---|
| 5,406,495 A * | 4/1995 | Hill .............................. | 702/72 |
| 5,721,896 A | 2/1998 | Ganguly et al. | |
| 5,870,752 A | 2/1999 | Gibbons et al. | |
| 6,012,064 A | 1/2000 | Gibbons et al. | |
| 7,093,056 B1 * | 8/2006 | Heighway et al. ........... | 710/310 |
| 7,191,181 B2 | 3/2007 | Chaudhuri et al. | |
| 7,193,968 B1 | 3/2007 | Kapoor et al. | |
| 7,287,020 B2 | 10/2007 | Chaudhuri et al. | |
| 7,293,037 B2 | 11/2007 | Chaudhuri et al. | |
| 7,293,086 B1 | 11/2007 | Duffield et al. | |
| 2004/0059828 A1 * | 3/2004 | Hooper et al. .............. | 709/238 |
| 2005/0022180 A1 * | 1/2005 | Couturier .................... | 717/173 |
| 2007/0016666 A1 | 1/2007 | Duffield et al. | |

OTHER PUBLICATIONS

Estan et al., "Building a Better NetFlow," SIGCOMM'04, Aug. 30-Sep. 3, Portland, Oregon, USA, pp. 245-256, 2004.*
Keys et al., "A Robust, System for Accurate Real-time Summaries of Internet raffic," SIGMETRICS 05, Jun. 6-10, Banff, Alberta, Canada, pp. 85-96, 2005.*
Cohen, "Size-Estimation Framework with Applications to Transitive Closure and Reachability," *Journal of Computer and System Sciences* 55:441-453, 1997.
Cohen et al., "Sketching Unaggregated Data Streams for Subpopulation-Size Queries," *Proc of the 2007 ACM Symp. On Principles of Database Systems*, 2007.

(Continued)

*Primary Examiner*—Huy D Vu
*Assistant Examiner*—James P Duffy
(74) *Attorney, Agent, or Firm*—Hoffman & Baron, LLP

(57) ABSTRACT

The invention relates to streaming algorithms useful for obtaining summaries over unaggregated packet streams and for providing unbiased estimators for characteristics, such as, the amount of traffic that belongs to a specified subpopulation of flows. Packets are sampled from a packet stream and aggregated into flows and counted by implementation of Adaptive Sample-and-Hold (ASH) or Adaptive NetFlow (ANF), adjusting the sampling rate based on a quantity of flows to obtain a sketch having a predetermined size, the sampling rate being adjusted in steps; and transferring the count of aggregated packets from SRAM to DRAM and initializing the count in SRAM following adjustment of the sampling rate.

13 Claims, 16 Drawing Sheets

OTHER PUBLICATIONS

Cohen et al., "Bottom-k Sketches: Better and More Efficient Estimation of Aggregates," *SIGMETRICS '07* Jun. 12-16, San Diego, CA, USA, 2007.

Cohen et al., "Spatially-Decaying Aggregation Over a Network: Model and Algorithms," *SIGMOD 2004*, Jun. 13-18, Paris, France, pp. 707-718, 2004.

Cohen et al., "Summarizing Data Using Bottom-k Sketches," *PODC'07*, Aug. 12-15, 2007 Portland, Oregon, USA, 2007.

Cranor et al., "Gigascope: A Stream Database for Network Applications," *SIGMOD* 2003, Jun. 9-12, San Diego, CA, pp. 647-651, 2003.

Estan et al., "Building a Better NetFlow," *SIGCOMM'04*, Aug. 30-Sep. 3, Portland, Oregon, USA, pp. 245-256, 2004.

Estan et al., "New Directions in Traffic Measurement and Accounting," *SIGCOMM'02*, Aug. 19-23, 2002 Pittsburgh, PA, USA, pp. 323-336, 2002.

Gibbons et al., "New Sampling-Based Summary Statistics for Improving Query Answers," *SIGMOD'98*, Seattle, WA, USA, pp. 331-342, 1998.

Hellerstein et al., "Online Aggregation," *SIGMOD '97* AZ, USA, pp. 171-182, 1997.

Hohn et al., "Inverting Sampled Traffic," *IMC '03* Oct. 27-29, Miami Beach, FL, USA, 2003.

Keys et al., "A Robust System for Accurate Real-time Summaries of Internet Traffic," *SIGMETRICS'05*, Jun. 6-10, Banff, Alberta, Canada, pp. 85-96, 2005.

Kumar, et al., "A Data Streaming Algorithm for Estimating Subpopulation Flow Size Distribution," *SIGMETRICS '05*, Jun. 6-10, Banff, Alberta, Canada, pp. 61-72, 2005.

Ramabhadran et al., "Efficient Implementation of a Statistics Counter Architecture," *SIGMETRICS '03*, Jun. 10-14, San Diego, CA, USA, 2003.

Ribeiro, et al., "Fisher Information of Sampled Packets: an Application to Flow Size Estimation," *IMC '06*, Oct. 25-27, Rio de Janeiro, Brazil, 2006.

Shah et al., "Maintaining Statistics Counters in Router Line Cards," 2002 IEEE, pp. 76-81.

Szegedy et al., "On the Variance of Subset Sum Estimation," ESA 2007, LNCS 4698, pp. 75-86. 2007.

\* cited by examiner gateway, port 3818 number of counts pareto 1.1, top-64

ALGORITHMS AND ESTIMATORS FOR SUMMARIZATION OF UNAGGREGATED DATA STREAMS

FIELD OF THE INVENTION

The present invention generally relates to streaming algorithms useful for obtaining summaries efficiently over unaggregated packet streams and for providing unbiased estimators for various characteristics, such as, for example, the amount of traffic that belongs to a specified subpopulation of flows, which are more accurate than prior art algorithms.

BACKGROUND OF THE INVENTION

Collection and summarization of network traffic data is necessary for many applications including billing, provisioning, anomaly detection, inferring traffic demands, and conjuring packet filters and routing protocols. Traffic includes interleaving packets of multiple flows but the summaries should support queries on statistics of subpopulations of IP flows, such as the amount of traffic that belongs to a particular protocol, originate from a particular AS, or both. These queries are posed after the sketch is produced. Therefore, it is critical to retain sufficient metadata information and provide estimators that facilitate such queries.

IP packet streams are processed in real-time at the routers by systems, such as Cisco's sampled NetFlow (NF) or processed by software tools, such as Gigascope [8]. Two critical resources in the collection of data are the high-speed memory (usually expensive fast SRAM) and CPU power that are used to process the incoming packets. The available memory limits the number of cached flows that can be actively counted. The processing power limits the level of per-packet processing and the fraction of packets that can undergo higher-level processing.

The practice is to obtain periodic summaries (sketches) of traffic by applying a data stream algorithm to the raw packet stream. NF samples packets randomly at a fixed rate. Once a flow is sampled, it is cached, and a counter is created that counts subsequent sampled packets of the same flow. The number of counters is the number of distinct sampled flows. The packet-level sampling that NF performs serves two purposes. First, it addresses the memory constraint by reducing the number of distinct flows that are cached (the bulk of small flows is not sampled). Without sampling, a counter is needed for each distinct flow in the original stream. Second, the sampling reduces the processing power needed for the aggregation, since only sampled packets require the higher-level processing required to determine if they belong to a cached flow.

An algorithm that is able to count more packets than NF using the same number of statistics counters (memory) is sample-and-hold (SH) [13, 12]. With SH, as with NF, packets are sampled at a fixed rate and once a packet from a particular flow is sampled, the flow is cached. The difference is that with SH, once a flow is actively counted, all subsequent packets that belong to the same flow are counted (with NF, only sampled packets are counted). SH sketches are considerably more accurate than NF sketches [13, 12]. A disadvantage of SH over NF, however, is that the summarization module must process every packet in order to determine if it belongs to a cached flow. This additional processing makes it less practical for high volume routers.

NF and SH use a fixed packet sampling rate, as a result, the number of distinct flows that are sampled and therefore the number of statistics counters required is variable. When conditions are stable, the number of distinct flows sampled using a given sampling rate has small variance. Therefore one can manually adjust the sampling rate so that the number of counters does not exceed the memory limit and most counters are utilized [12]. Anomalies such as DDoS attacks, however, can greatly affect the number of distinct flows. A fixed-sampling-rate scheme can not react to such anomalies as its memory requirement would exceed the available memory. Therefore, anomalies would cause disruption of measurement or affect router performance. These issues are addressed by adaptive variants that include adaptive sampled NetFlow (ANF) [13, 11, 16] and adaptive SH (ASH) [13, 12]. These variants adaptively decrease the sampling rate and adjust the values of the statistics counters as to emulate sampling with a lower rate.

SUMMARY OF THE INVENTION

Statistical summaries of IP traffic are at the heart of network operation and are used to recover information on arbitrary subpopulations of flows. It is, therefore. of great importance to collect the most accurate and informative summaries given the router's resource constraints. IP packet streams consist of multiple interleaving IP flows. While queries are posed over the set of flows, the summarization algorithm is applied to the stream of packets. Aggregation of traffic into flows before summarization is often infeasible and, therefore, the summary has to be produced over the unaggregated stream. Cisco's sampled NetFlow, based on aggregating a sampled packet stream into flows, is the most widely deployed such system.

Two sources of inefficiency have been observed in the prior art methods. First, a single parameter (the sampling rate) is used to control utilization of both memory and processing/access speed, which means that it has to be set according to the bottleneck resource. Second, the unbiased estimators are applicable to summaries that in effect are collected through uneven use of resources during the measurement period (information from the earlier part of the measurement period is either not collected at all and fewer counter are utilized or discarded when performing a sampling rate adaptation).

The present invention provides algorithms that collect more informative summaries through an even and more efficient use of available resources. The heart of this approach is a novel derivation of efficiently-computable unbiased estimators that use these more informative counts. It has now been analytically proven that these estimators are superior (have at most the same variance on all packet streams and subpopulations) to prior art approaches. Simulations on Pareto distributions and IP flow data show that the summaries of the present invention provide significantly more accurate estimates. The implementation designs of the present invention can be efficiently deployed at routers.

In one embodiment, the present invention provides a method of obtaining a sketch of an unaggregated packet stream comprising aggregating sampled packets in accordance with a flow associated with the sampled packets, the packets being sampled from the packet stream at a sampling rate; counting the aggregated packets using Adaptive Sample-and-Hold (ASH); adjusting the sampling rate based on a quantity of flows to obtain a sketch having a predetermined size, the sampling rate being adjusted in steps; and transferring the count of aggregated packets from SRAM to DRAM and initializing the count in SRAM following adjustment of the sampling rate.

The method can further comprise calculating an adjusted weight of each flow using:

$$A^{sSH}(n) = \frac{(1-p_1) + \sum_{i=1}^{r} n_i \left(1 - \sum_{h=1}^{i} c_{h,h}\right)}{1 - \sum_{h=1}^{r} c_{h,h}}$$

r being a total quantity of steps,
$n=(n_1, \ldots, n_r)$ such that $n_i$ is the number of packets counted from the flow in step i, and $c_{h,h}(h=1, \ldots, r)$ are defined by:
$c_{1,j}=(1-p_j)$ for $1 \leq j \leq r$,
$c_{2,j}=(1-p_j)^{n_1-1}(c_{1,j}-c_{1,1})$ for $2 \leq j \leq r$,
$c_{i,j}=(1-p_j)^{n_1-1}(c_{i-1,j}-c_{i-1,i-1})$ for $3 \leq i \leq j \leq r$,
$p_1 > \ldots > p_r$ is the sampling rate at step $i=1, \ldots r$.

The adjusted weight of the flow represents an estimate of the size of the flow.

The method can further comprise summing the adjusted weights of each flow in a subpopulation of flows to obtain a size of the subpopulation of flows. The subpopulation of flows can be associated with at least one of a protocol, source, and application.

In one embodiment, the method can further comprise sampling all packets at a fixed rate $p_{base}$ to obtain a $p_{base}$-sampled stream to reduce the packet stream before aggregating and counting.

In one embodiment, the method can further comprise decreasing the sampling rate in response to i) a quantity of cached flows being equal to a maximum quantity of cached flows, and ii) a sampled packet not being associated with a cached flow, using three tunable parameters $\mu$, $p_{start}$ and $p_{base}$, wherein $0<\mu<1$, $p_{base} \leq 1$ and $p_{start} \leq p_{base}$ and sampling rates are of the form $(p_{start}/p_{base})\mu^t$ where t is a nonnegative integer. In this embodiment, the method can further comprise calculating an adjusted weight of a flow using:

$$A^{sSH}(n) = \frac{(1-p_1) + \sum_{i=1}^{r} n_i \left(1 - \sum_{h=1}^{i} c_{h,h}\right)}{1 - \sum_{h=1}^{r} c_{h,h}}$$

r being a total quantity of steps,
$n=(n_1, \ldots, n_r)$ such that $n_i$ is the number of packets counted from the flow in step i, and $c_{h,h}(h=1, \ldots, r)$ are defined by:
$c_{1,j}=(1-p_j)$ for $1 \leq j \leq r$,
$c_{2,j}=(1-p_j)^{n_1-1}(c_{1,j}-c_{1,1})$ for $2 \leq j \leq r$,
$c_{i,j}=(1-p_j)^{n_1-1}(c_{i-1,j}-c_{i-1,i-1})$ for $3 \leq i \leq j \leq r$,
$p_1 > \ldots > p_r$ is the sampling rate at step $i=1, \ldots r,$.

In another aspect, the invention provides a method of obtaining an unbiased estimate of a quantity of flows of size i in a packet stream comprising aggregating sampled packets in accordance with a flow associated with the sampled packets, the packets being sampled from the packet stream at a sampling rate; counting the aggregated packets using Adaptive Sample-and-Hold (ASH); adjusting the sampling rate based on a count of the aggregated packets to obtain a sketch having a predetermined size, the sampling rate being adjusted in steps; transferring the count of aggregated packets from SRAM to DRAM and initializing the count in SRAM following adjustment of the sampling rate; calculating the unbiased estimate $\alpha_i^{sSH}(p,n)$, p being a sampling rate vector for a flow with count vector n and $$0 < i \leq \sum_{h=1}^{r} n_h,$$

wherein if $|n|=1$
then $\alpha_1^{sSH}(p,n) = 1/p_r$, if $n_r = |n| > 1$
then $\alpha_{|n|}^{sSH}(p,n) = 1/p_r$ and $\alpha_{|n|-1}^{sSH}(p,n) = -(1-p_\tau)/p_r$, for $l=3, \ldots, r-1$, for $l=2$ if $n_1 > 1$, and for $l = n_r > 0$ then: $\alpha_{\sum_{h=l}^{r} n_h}^{sSH}(p,n) = \frac{-c_{l,l}}{q^{sSH}[n|n]}$.

if $n_1 = 1$, then $\alpha_{\sum_{l=2}^{r} n_h}^{sSH}(p,n) = \frac{-(1-p_2)}{q^{sSH}[n|n]}$.

if $n_1 > 1$, then $\alpha_{-1+\sum_{h=1}^{r} n_h}^{sSH}(p,n) = \frac{-(1-p_1)}{q^{sSH}[n|n]}$ $\alpha_{\sum_{h=1}^{r} n_h}^{sSH} = \frac{1}{q^{sSH}[n|n]}$ and $q^{sSH}[n|n] = 1 - \sum_{h=1}^{r} c_{h,h}$ wherein $c_{h,h}(h=1, \ldots, r)$ is defined by:
$c_{1,j}=(1-p_j)$ for $1 \leq j \leq r$
$c_{2,j}=(1-p_j)^{n_1-1}(c_{1,j}-c_{1,1})$ for $2 \leq j \leq r$
$c_{i,j}=(1-p_j)^{n_1-1}(c_{i-1,j}-c_{i-1,i-1})$ for $3 \leq i \leq j \leq r$.

In one embodiment, the flows of size i belong to one subpopulation of flows.

In another aspect, the invention provides a method of obtaining a sketch of an unaggregated packet stream comprising aggregating sampled packets in accordance with a flow associated with the sampled packets, the packets being sampled from the packet stream at a sampling rate; counting the aggregated packets using Adaptive NetFlow (ANF); adjusting the sampling rate based on a quantity of flows to obtain a sketch having a predetermined size, the sampling rate being adjusted in steps; transferring the count of aggregated packets from SRAM to DRAM and initializing the count in SRAM following adjustment of the sampling rate; and calculating an adjusted weight of cached flows using the count of aggregated packets.

The method can further comprise calculating the adjusted weight of each flow using:

$$A^{sNF}[n] = \frac{\sum_{j=1}^{r} \frac{n_j}{p_j} \left(\prod_{h=1}^{r} p_h^{n_h} - \sum_{l=2}^{j} d_{l,l}\right)}{\prod_{h=1}^{r} p_h^{n_h} - \sum_{j=2}^{r} d_{j,j}}$$

$d_{i,j}(p, n)(2 \leq i \leq j \leq r)$ are defined as follows.

$$2 \leq j \leq r: d_{2,j} = \left(\frac{p_1 - p_j}{p_1}\right)^{n_1} \prod_{h=1}^{r} p_h^{n_h}$$

$$3 \leq i \leq j \leq r: d_{i,j} = \left(\frac{p_{i-1} - p_j}{p_{i-1}}\right)^{n_{i-1}} (d_{i-1,j} - d_{i-1,i-1})$$

for $2 \leq i \leq j \leq r$, $d_{i,j}(p, n)$ is the probability that all packets of flow n have rank values below the sampling rate at packet arrival time, that the flow is fully counted by sNF until the transition into step i, and that at the beginning of step i, the rank of the flow is at least $p_j$, wherein $p_1, \ldots, p_r$ are steps of the sampling rate and $n_1, \ldots, n_r$ are the corresponding counts of each step.

The method can further comprise summing the adjusted weight of each flow in a subpopulation of flows to obtain the size of the subpopulation of flows. The subpopulation of flows can be associated with at least one of a protocol, source, and application.

In one embodiment, the method can further comprise decreasing the sampling rate in response to i) a quantity of cached flows being equal to a maximum quantity of cached flows, and ii) a sampled packet not being associated with a cached flow, using three tunable parameters $\mu$, $p_{start}$ and $p_{base}$, wherein $0 < \mu < 1$, $p_{base} \leq 1$ and $p_{start} \leq p_{base}$ and sampling rates are of the form $(p_{start}/p_{base})\mu^t$ where t is a nonnegative integer.

In one embodiment, the method of can further comprise calculating an adjusted weight using:

$$A^{sNF}[n] = \frac{\sum_{j=1}^{r} \frac{n_j}{p_j} \left(\prod_{h=1}^{r} p_h^{n_h} - \sum_{l=2}^{j} d_{l,l}\right)}{\prod_{h=1}^{r} p_h^{n_h} - \sum_{j=2}^{r} d_{j,j}}$$

r being a quantity of steps, $p_1 > \ldots > p_r$ being corresponding sampling rates, $n_i$ being the number of packets counted from the flow in step i.

A system and computer-readable medium in accordance with the present invention, which incorporate at least some of the preferred features, is intended to be within the scope of the present invention. The system may be implemented using at least one of a microprocessor, a microcontroller, programmable logic, and/or an application specific integrated circuit (ASIC) with or without software and/or firmware. The computer-readable medium may include a compact disc (CD), digital video disc (DVD), and/or tape, which include instructions that when executed by at least one computing device performs the methods in accordance with the present invention.

Other objects and features of the present invention will become apparent from the following detailed description considered in conjunction with the accompanying drawings. It is to be understood, however, that the drawings are designed as an illustration only and not as a definition of the limits of the invention.

DETAILED DESCRIPTION OF THE INVENTION

1. Overview

Figure 1:
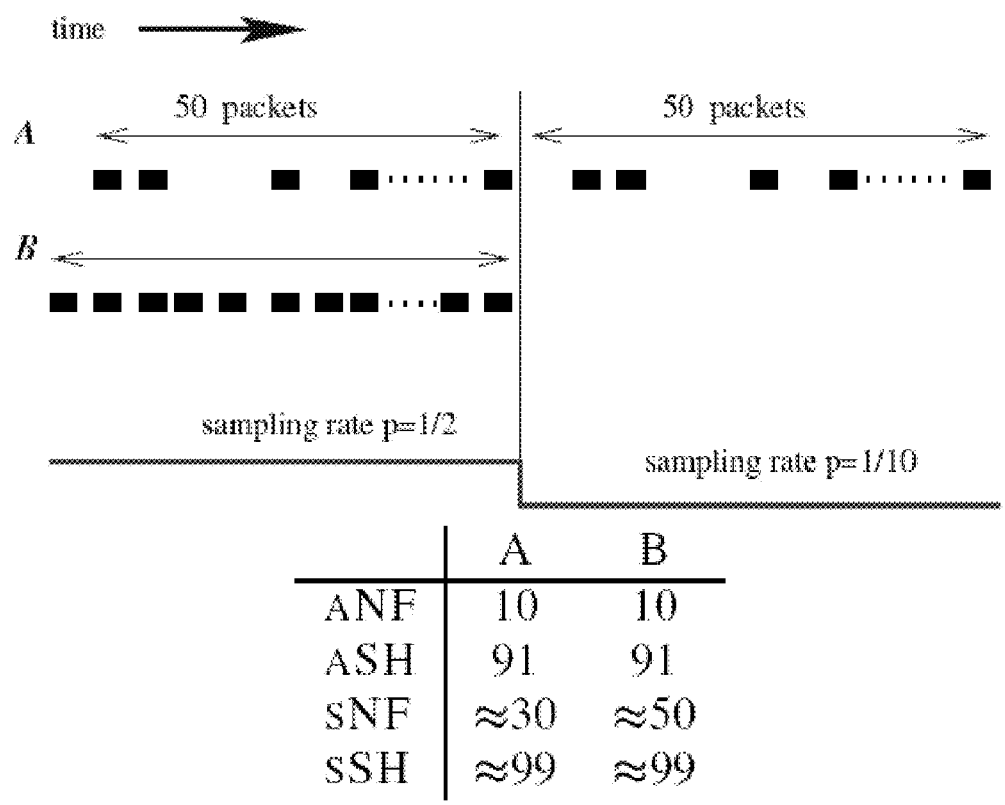
FIG. 1 shows the expected counts of two 100-packet flows. Flow A has 50 packets with current sampling rate 0.5 and 50 packets with current rate 0.1. Flow B has 100 packets with current sampling rate 0.5. The final counts with aNF and aSH only depends on the final sampling rate. sNF and sSH benefit from the higher sampling rate at the beginning of the measurement period and the final counts account for more packets.

In one embodiment, the present invention includes sketching algorithms for packet streams that obtain considerably more accurate statistics than existing approaches. The sketches can be used for many types of queries, such as, subpopulation-size queries (number of packets of a subpopulation), and bytes and flow size distribution. Available resources are used in a balanced and load-sensitive way to collect more information from the packet sample. In a further embodiment, the present invention includes unbiased estimators that use the additional information. The algorithms of the present invention are robust to anomalies and changes in traffic patterns, and gracefully degrade performance when there is a decrease in available resources. They are supported by rigorous analysis.

Step counts for NF and SH. NF, SH, and their adaptive variants do not equally utilize available resources through the measurement period: The number of cached flows increases through the measurement period and reaches its maximum only at the end. The adaptive ANF and ASH fully utilize all counters, but this utilization is in a sense "wasted" and does not translate into more accurate estimates, as each rate adaptation (decrease of the sampling rate) is implemented by discarding the more informative counts obtained with the lower sampling rate [13, 11].

Step-counting NetFlow (sNF) and step-counting sample-and-hold (sSH) process the same packets as their adaptive counterparts, but when performing rate adaptation, they retain the current counts. sSH and sNF build on a simple but powerful design [20, 18] of transferring partial counts from (fast and expensive) SRAM to (slower and cheaper) DRAM, which allows us to use smaller size counters in SRAM and add the counts to larger DRAM counters when the SRAM counters are about to overflow. This design allows one to distinguish between the resources required for active counting and those required for intermediate storage. While applicable to all methods, sNF and sSH are able to make a further use of this design by transferring, after each rate adaptation, the counts into DRAM. Counting more of the processed packets in the final summary is the key for obtaining better estimates.

Hybrids of NF and SH. There are multiple resource constraints for gathering statistics. At the router, the memory size that determines the number of statistics counters and the CPU processing (or size of specialized hardware) that determines the fraction of packets that can be examined against the flow cache. Other constraints are the available bandwidth and storage to transmit and store the final sketch. Previous schemes, however, use a single parameter (sampling rate) with these multiple constraints: NF (and ANF and sNF), must set (or adjust) the sampling rate to be low enough so that the number of counters does not over flow or over utilize the router memory. As a result, resources available for processing packets may not be fully utilized. SH (and ASH and sSH), on the other hand, do not address CPU processing constraints at all, and all packets are processed. The present invention includes hybrid schemes of SH variants that use two packet sampling rates. The first one controls the fraction of packets that are processed in order to determine if they belong to an already-cached flow. The second, and lower, rate, determines the fraction of packets that can create new entries of cached flows.

Subpopulation weight estimators. (Section 4) The sketches of the present invention have the form of a subset of the flows along with the flow attributes and an adjusted weight associated with each flow. Adjusted weights have the property that for each flow, the expectation is equal to its actual size. (Adjusted weights of flows not included in the sketch are defined to be zero). Therefore, an unbiased estimate for the size of a subpopulation of flows is obtained by summing the adjusted weights of flows in the sketch that belong to this subpopulation. The per-flow unbiasedness property is highly desirable as accuracy increases when aggregating over larger subpopulations and when combining estimates obtained from sketches of different time periods. The invention provides the calculation and analysis of unbiased adjusted weights.

The derivation of adjusted weights for NF, which applies fixed-rate sampling, is standard: a simple scaling of the counts by the inverse sampling rate. The present invention provides adjusted weights assignments for ANF, ASH, sSH and sNF. These assignments can be computed efficiently. The present specification describes what information to gather and how to use it to obtain correct adjusted weights. The derivation and efficient computation of correct unbiased adjusted weights for sNF and sSH are novel and highly nontrivial. The adjusted weights have minimum variance among all estimators that use the same information (the counts gathered by the algorithm for the flow), and in this sense are optimal.

The quality of the adjusted weight assignment depends on the distribution over subsets of flows that are included in the sketch, the information collected by the algorithm for these flows, and the procedure used to calculate these weights. The distribution of the subsets of flows included in the sketch produced by each of the algorithms NF, SH, hybrids, and variants, is that of drawing a weighted sample without replacement (WS) from the full set of aggregated flows. Therefore, the difference in the quality of the sketches stems only from the variance of the adjusted weights assigned. More informative counts are beneficial only if they correspond to adjusted weights with lower variance. In this specification, the variance of the adjusted weight assignment is analyzed and a strong relation between the different methods that holds for any packet stream and any flow or subpopulation of flows is established: The sSH estimator has at most the variance of ASH and of sNF, and sNF has at most the variance of ANF.

FSD and other subpopulation properties. (Sections 5 and 6) There are multiple aggregates of interest over subpopulations and it is important that the same summaries can support queries for these aggregates. In this specification, unbiased estimators for important classes of aggregates are derived. Flow Size Distribution (FSD) estimators, that provide unbiased estimates on the number of distinct flows of certain range of sizes in a subpopulation are derived in Section 5. Estimators for other properties such as total bytes or total number of AS hops to destination are derived in Section 6. For a cleaner exposition, lengthy or technical proofs are deferred to Section 9.

Implementation. The implementation design piggybacks on several existing ingredients. The basis is the flow counting mechanism that Cisco's NF deploys. (Proposed improved implementation such as [18, 11] can also be integrated.) A router implementation of adaptive sampling rate for ANF was proposed in [11, 16] (rate adaptation was termed renormalization). This design can also be used for ASH and the step-counting and hybrid variants.

Discretized sampling rates. (Section 7) The pure adaptive models perform a rate adaptation each time a flow is "evicted" from the cache. Rate adaptations, however, are intensive operations [11, 16]. The present invention provides a "router friendly" variant of the pure model with discretized sampling rates. This design drastically reduces the number of rate adaptations and also simplifies their implementation. As in [11], discretization allows efficient rate adaptations. The discretized model, however, differs mathematically from the pure sampling schemes. In this specification, it is shown how to apply the estimators derived for the pure schemes to the discretized schemes. More importantly, it is shown that these estimators are also unbiased and retain other key properties of the estimators for the pure model. Furthermore, the particular discretization used was critical for the unbiasedness arguments to hold.

Performance study. (Section 8) In this specification, the performance of these methods on IP flows data collected by unsampled NF running on a gateway router and on synthetic data obtained using Pareto distribution with different parameter values is evaluated. On the IP data, subpopulations of flows that belong to specified applications are considered; and on the synthetic data, prefixes and suffixes of the flow size distribution are considered. The step-counting sNF and sSH provide significantly more accurate estimates than their adaptive counterparts. The SH variants significantly dominate their NF counterparts and the hybrid version provides a smooth performance curve between these two extremes. Even with low sampling rates, the hybrids are able to provide much more accurate estimates than plain NF, ANF, and sNF. In the specification, it is also shown that the implementation design of the invention can be tuned to provide a very low number of rate adaptations.

2. Related Work

An orthogonal summarization problem is summarizing aggregated data [14]. For example, using k-mins or bottom-k sketches [1, 4, 7, 5, 10]. Estimators developed for these summaries utilize the weight of each item, which is not readily available in an unaggregated setup. Direct application requires pre-aggregation, that is, obtaining an exact packet count for each flow as when running unsampled NF. This is infeasible in high volume routers as it requires processing of every packet and storing an active counter for every flow. These methods can be used, however, to trim the size of a sketch obtained using any method that obtains unbiased adjusted weights (including NF, SH, and their variants), when trimming is needed in order to address transmission bandwidth or storage constraints.

An extension of ASH that does not discard counts when a rate adaptation is performed was considered in [12] finding "elephant flows." While this extension attempts to provide similar benefit to step-counting, it is not adequate for estimating subpopulation sizes. The unadjusted count itself is indeed a better estimator than the reduced count for each individual flow, but this estimator is inherently biased. The bias depends on where in the measurement period the packets occurred, and an unbiased estimator can not be constructed from the counts collected. The relative bias is very large on smaller flows (of the order of the inverse sampling-rate) and if used to estimate subpopulation sizes for such flows, a large relative error on such subpopulations (even is the subpopulation size is large) can be obtained.

Kumar et al [17] proposed a streaming algorithm for IP traffic that produces sketches that allow us to estimate the flow size distribution (FSD) of subpopulations. Their design executes two modules concurrently. The first is a sampled NetFlow module that collects flow statistics, along with full flow labels, over sampled packets. The second is a streaming module that is applied to the full packet stream and uses an array of counters, accessed by hashing. Estimating the flow size distribution is a more general problem than estimating the size of a subpopulation, and therefore this approach can be used to estimate the subpopulations sizes. To be accurate, however, the number of counters in the streaming module should be roughly the same as the number of flows and therefore the size of fast memory (SRAM) should be proportional to the number of distinct flows.

In some cases, protocol-level information such as testing for the TCP syn flag [9] on sampled packets and using TCP sequence numbers [19] can be used to obtain better estimates of the size of the flow from sampled packets. These methods can significantly increase the accuracy of estimating the flow size distribution of TCP flows from packet samples, but are not as critical for subpopulation size estimates for subpopulations with multiple flows. In some embodiments, these methods can be integrated with the sketches of the present invention.

3. Sketching Algorithms

The present invention provides the underlying mathematical models of different flow sampling schemes. These models are used in the analysis and are mimicked by the "router friendly" implementations. The sampling schemes are data stream algorithms that are applied to a stream of packets.

Sampled NF performs fixed-rate packet sampling. Packets are sampled independently at a rate p and sampled packets are aggregated into flows. All flows with at least one sampled packet are cached and there is an active counter for each flow. The sketch includes all flows that are cached in the end of the measurement period.

SH, like NF, samples packets at a fixed rate p and maintains a cache of all flows that have at least one sampled packet. SH, however, processes all packets and not only sampled packets. If a processed packet belongs to a cached flow, it is counted.

Rank-based View of the Sample Space

The analysis is facilitated through a rank-based view of the sample space: Each point in the sample space is a rank assignment, where each packet is assigned a rank value that is independently drawn from U [0,1]. The actions of each of the sampling algorithms that are considered are defined by the rank assignment. Implementations do not track per-packet random rank values or even draw rank values. They maintain just enough "partial" information on the rank assignment to maintain a flow cache and counts that are consistent with the rank-based view.

For each flow f∈F and position in the packet stream, the current rank value r(f) is defined to be the smallest rank assigned to a packet of the flow that occurred before the current position in the packet stream.

An NF sketch with sampling rate p is equivalent to obtaining a rank assignment and counting all packets that have rank value <p. The set of actively counted flows at a given time is $\{f \in F | r(f) < p\}$.

An SH sketch with sampling rate p is equivalent to obtaining a rank assignment and counting all packets such that the current rank of the flow (including the current packet) at the time the packet is processed is smaller than p.

Adaptive Algorithms

The adaptive algorithms ANF and ASH work with a fixed limit k on the number of cached flows and produce a sketch of k flows. When the number of cached flows exceeds k, the sampling rate is "retroactively" decreased, and counts are adjusted, so that only k flows remain cached. The current sampling rate is deemed to be the (k+1)st smallest rank among r(f) (f∈F) (it is defined to be 1 if there are fewer than (k+1) distinct flows.)

It is sometimes necessary to set a limit $p_{start} < 1$ on the initial sampling rate. In this case, the current sampling rate is defined to be $p_{start}$ if there are fewer than (k+1) distinct flows and otherwise is the minimum of $p_{start}$ and the (k+1)st smallest rank among r(f)(f∈F).

The sampling rate is determined by the rank assignment, the prefix of processed packets, and $p_{start}$ (it does not depend on the sampling scheme). The effective sampling rate is defined as the value of the sampling rate at the end of the measurement period.

The set of cached flows at a given time (by either ANF or ASH) are the flows with current rank that is below the current sampling rate. The (current) ANF count of a cached flow is the number of packets seen so far with rank that is below the current sampling rate. The (current) ASH count of a cached flow f is the number of packets seen so far such that the rank of the flow just after the processing of the packet is below the current sampling rate.

The sketch includes the set of cached flows and their counts at the end of the measurement period.

Step-counting

A decrease of the current sampling rate is referred to as rate adaptation. The adaptive algorithms [13, 11] implement rate adaptation by decreasing the more informative flow counts that corresponded to the higher sampling rate. The step-counting algorithms, sNF and sSH, record these counts instead of adjusting them down. The active counting of packets performed by the step-counting algorithms is just like their adaptive counterparts, but the step-counting algorithms produce a vector of counts, rather than a single count, for each flow in the sketch.

Using the rank-based view, sNF counts include all packets such that (i) the rank of the packet is below the value of the sampling rate when (just after) the packet is processed (ii) the rank of the flow remains continuously below the sampling rate since the packet was processed until the current time. sSH counts include all packets such that when (just after) the packet is processed and continuously until the current time, the rank of the flow is below the sampling rate. With both sNF and sSH, a flow is cached if and only if its rank is below the current sampling rate. FIG. 1 motivates, through an example, the design of the step-counting algorithms. The figure shows two flows and the expected number of packets included in the final count by each method. The step-counting sNF and sSH count many more packets than their adaptive counterparts.

Hybrids

FIG. 1 shows that ASH and sSH count many more packets than ANF and sNF. This advantage, however, comes at a cost: ANF and sNF simply ignore all packets that are not sampled while ASH and sSH have to process all packets in order to determine if they belong to a cached flow. The hybrid algorithms of the present invention provide a smooth tradeoff between the fraction of packets that are processed and the fraction that are included in the final count.

Hybrid sketching algorithms use a base sampling rate parameter $p_{base}$, which controls the fraction of packets that are processed by the algorithm. The initial sampling rate is $p_{start} \leq p_{base}$. A hybrid algorithm samples all packets independently at a fixed rate $p_{base}$ and then applies a respective basic algorithm (SH, ASH, or sSH) to the $p_{base}$-sampled stream with initial sampling rate $P'_{start} = p_{start}/p_{base}$. (Hybrid NF variants with $p_{start} \leq p_{base}$ are equivalent to applying the underlying NF variant and therefore only hybrid SH variants are considered.)

The rank-based view of the hybrid algorithms is as follows. Hybrid-ASH counts include a packet if and only if (i) the rank of the packet is below $p_{base}$ and (ii) the rank of the flow at the time (just after) the packet is processed is below the current sampling rate. Hybrid-sSH counts include a packet if and only if (i) the rank of the packet is below $p_{base}$ and (ii) continuously, from (just after) the time the packet is processed until the current time, the rank of the flow was below the sampling rate. A flow is cached with hybrid-ASH and hybrid-sSH if and only if its rank value is below the current sampling rate.

An equivalent rank-based view of the hybrid algorithms discards all packets with rank value above $p_{base}$, scales the rank values of the remaining packets and $p_{start}$ by $p^{-1}_{base}$, and applies the respective basic algorithm.

The following table shows the expected number of packets that are counted and processed for the example 100-packet flows in FIG. 1. The hybrids use $p_{start} = p_{base} = 0.5$ and have respective sampling rates of 1 and 0.2 on the $p_{base}$-sampled stream. The step-counting algorithm counts more of the processed packets than their adaptive counterparts. The hybrids provide a tradeoff that preserves the higher ratios between counted and processed packets.

|  | A | B |
|---|---|---|
| ANF | 10/30 | 10/50 |
| ASH | ≈91/100 | ≈91/100 |
| hybrid-ASH | ≈46/50 | ≈46/50 |
| SNF | ≈30/30 | ≈50/50 |
| SSH | ≈99/100 | ≈99/100 |
| hybrid-SSH | ≈50/50 | ≈50/50 |

4. Adjusted Weights

The information collected by the algorithms is used to compute adjusted weights that are associated with each flow that is included in the sketch (flows that are not in the sketch have an adjusted weight of zero).

The notation $A^L(f)$ is used, where $L \in \{ASH, ANF, sSH, sNF, NF, SH\}$, for the random variable that is the adjusted weight assigned to the flow f by the algorithm L. The adjusted weights assigned are a function of the counts collected by the algorithm and of the sampling rate.

Clearly, a correct adjusted weight for NF counts for a flow f with count i(f) is $A_p^{NF}(f) = i(f)/p$ (the number of counted packets divided by the sampling rate p). The derivation of the adjusted weight assignments for the adaptive algorithms is more subtle and based on partitioning the sample space as in [4, 5, 10]. This partitioning allows application of the adjusted weights expressions that are applicable to the corresponding fixed-rate variants.

It has been found that there is a unique deterministic assignment of adjusted weights for each of the algorithms considered. Since deterministic assignment has smaller variance than any randomized one, it is preferable.

Lemma 4.1. Let i(>) be the packet count collected for a flow f by ANF.

$A_{p'}^{ANF}(f) = i(f)/p'$. where p' is the effective sampling rate, are correct adjusted weights.

Proof. Consider a flow f, and the probability subspace where the kth smallest rank among r(f') (f'∈F\{f}) is p'. Consider the conditional distribution of the number of packets of flow f that are counted. The number of packets is just like what would have been counted with NF with rate P. Therefore, $A_{p'}^{ANF}(i(f)) = A_p^{NF}(i(f))$ are unbiased adjusted weight for f within this probability subspace.

Lemma 4.2. Let i(f) be the number of counted packets for a flow f with SH. The assignment $A_p^{SH}(f) = i(f) + (1-p)/p$ if i(f)>0 (the flow is sampled) are correct adjusted weights.

Proof. $A_p^{SH}(i)$. the adjusted weight assigned to a flow with count of i packets has been derived (the superscript and subscript is omitted when clear from context) and it is shown that this is the unique deterministic assignment.

$A_p(0)=0$ (items that are not sampled at all obtain zero adjusted weight). In order for the assignment to be unbiased for 1-packet flows, $pA_p(1)+(1-p)A_p(0)=1$. Substituting $A_p(0)$, yields $A_p(1)=1/p$.

To be correct for n-packet items, $\Sigma_{i=0}^{n}(1-p)^i pA_p(n-i)=n$.

These are solved for n=2, 3, 4 . . . to obtain that $A_p(n)=(1+(n-1)p)/p=(1-p)/p+n$ for $n \geq 1$.

This assignment can also be derived by applying the Horvitz-Thompson estimator to each packet. For each packet, the partition of the sample space to two parts is looked at, one where a previous packet is sampled, and the other where a previous packet is not sampled. The adjusted weight assigned to a packet is unbiased on each part: if a previous packet is sampled, the probability that a packet is counted is 1 and its adjusted weight is 1. If no previous packet is sampled, then the probability that the packet is sampled is p and the Horvitz-Thompson adjusted weight is 1/p. The adjusted weight of the flow is the sum of the adjusted weights of sampled packets. This assignment can be interpreted as the first sampled packet of the flow representing 1/p unseen packets whereas subsequent counted packets of the flow represent only themselves.

Lemma 4.3. Consider ASH and let i(f) be the ASH count of a flow and p' be the effective sampling rate. The assignment $A_{p'}^{ASH}(f)=i(f)+(1-p')/p'$ (if i(f)>0) are correct adjusted weights.

Proof. The proof is similar to that of Lemma 4.1: For each flow, the probability subspace, where the kth smallest rank among the flows $F\setminus\{f\}$ is fixed, is considered and unbiased weights within this subspace are assigned.

The information collected using sNF and sSH is the step function $1 \geq p_1 > p_2 > \ldots > p_r$ denoted by the vector $p=(p_1, \ldots, p_r)$ of the current sampling rate and for each sampled flow, the counts $i(f)=(i_1(f), i_2(f), \ldots i_r(f))$ of the number of packets recorded at each step. The adjusted weight assignment for a flow f is a function of p and i(f). The following notation is used $$A_p^{sNF}(i(f)) \equiv A_{p_1, p_2, \ldots, p_r}(i_1(f), i_2(f), \ldots, i_r(f))$$

for the adjusted weight assigned by sNF, and similarly, $A_p^{sSH}(i(f))$ for the adjusted weight assigned by sSH.

Adjusted weights are computed after the counting period is terminated. After they are computed, the count vectors can be discarded. Therefore, sNF and sSH produce a sketch of size k.

Theorem 4.4. The adjusted weight $A_p^{sNF}(n)$ for sNF and $A_p^{sSH}(n)$ for sSH can be computed using number of operations that is quadratic in the number of steps with a non-zero count.

The adjusted weights for sSH and sNF sketches are derived. The adjusted weights for ANF and ASH are based on "plugging in" the effective (final) sampling rate in the adjusted weights expressions of the non-adaptive variant. The argument for unbiasedness is based on the fact that the adjusted weights of each flow are unbiased on each part of some partition of the sample space. For the step-counting algorithms, the adjusted weights assigned to a flow f are unbiased in the probability subspace defined by the steps of the rank value of the current kth-smallest rank of a flow among $F\setminus f$. These steps are the same as the current sampling rate when the flow is actively counted. Technically, the kth-smallest rank of an actively counted flow on steps that precede the active counting of f is considered. The adjusted weight function, however, has the property $$A_{p_1, p_2, \ldots, p_r}(0, \ldots, 0, i_j, i_{j+1}, \ldots, i_r) = A_{p_j, p_{j+1}, \ldots, p_r}(i_j, i_{j+1}, \ldots, i_r)$$ (Eq. 1)

and therefore does not depend on the current sampling rate in the duration before the final contiguous period where the flow is actively counted. This means that it is sufficient to record the steps of the current sampling rate. Eq. (1) is an instance of the following generalization that states that the adjusted weight assignment does not depend on the values of the current sampling rate in durations when there are no counted packets.

Lemma 4.5. Consider a correct assignment of adjusted weight $A_p(n)$. For an observed count i and p, let $1 \leq j_1 < j_2 < \ldots < j_{r'} \leq r$ be the coordinates such that $i_{j_k} > 0$ or $i_{j_k} = r$ (that is, r is included also if $i_r = 0$).

$$A_{p_1, p_2, \ldots, p_r}(0, \ldots, 0, i_{j_1}, 0, i_{j_2}, \ldots) = A_{p_{j_1}, p_{j_2}, \ldots, p_{j_{r'}}}(i_{j_1}, i_{j_2}, \ldots, i_{j_{r'}})$$ (Eq. 2)

The lemma allows statement of the adjusted weight of a flow in terms of an equivalent flow where the number of steps is equal to the number of steps where the original flow had a nonzero count. It also allows the assumption, without loss of generality in the analysis, that all steps except possibly the last step have positive counts.

4.1 Adjusted Weights for sSH

Let r be the number of steps and $p_1 > \ldots > p_r$ the corresponding sampling rates. For a flow f let $n=(n_1, \ldots, n_r)$ be the number of packets of f in each step and let $i=(i_1, \ldots, i_r)$ be the number of counted packets in each step. The probability that a flow with n packets has a count of i is denoted by q[i|n].

Expressions for the adjusted weights for sSH and sNF sketches that can be computed in time quadratic in the number of steps (which is logarithmic in the number of packets) are provided. It is then argued that the number of operations can be further reduced to be quadratic in the number of steps where the flow has a non-zero count. This distinction is important since many flows, in particular bursty or small flows, can have non-zero count on a single step or very few steps.

The values $c_{i,j}(p,n)$ ($1 \leq i \leq j \leq r$) are defined as follows (the parameters (p,n) are omitted when clear from context, and it is assumed that $n_1 > 0$ w.l.o.g.):

$1 \leq j \leq r: c_{1,j} = (1-p_j)$ $2 \leq j \leq r: c_{2,j} = (1-p)^{n_1-1}(c_{1,j}-c_{1,1})$ $3 \leq i \leq j \leq r: c_{i,j} = (1-p)^{n_{i-1}}(c_{i-1,j}-c_{i-1,i-1})$ The following two lemmas are immediate from the definitions.

Lemma 4.6. For $1 \leq j \leq r$, $c_{1,j}$ is the probability that the rank of the first packet of the flow is at least $p_j$.

For $2 \leq i \leq j \leq r$, $c_{i,j}(p,n)$ is the probability that the flow n is fully counted by sSH until the transition into step i, and at the beginning of step i, the rank of the flow is at least $p_j$.

Lemma 4.7 The computation of the partial sums $$\sum_{h=1}^{i} c_{h,h}$$

for i=1, . . . , r can be performed in $O(r^2)$ operations.

By lemma 4.6, $c_{i,i}$ ($i \in \{1, \ldots, r\}$) is the probability that the sSH counting of the flow progressed continuously from the start until the transition into step i, and halted in this transition (as the current rank of the flow was above $p_i$). So $$q[n|n] = 1 - \sum_{h=1}^{r} c_{h,h}.$$ (Eq. 3)

The following theorem expresses the adjusted weight $A^{SH}(n)$ as a function of the diagonal sums $\Sigma_{h=1}^{i} c_{h,h}$ ($h=1,\ldots,r$). The proof is provided in Section 9.1.

Theorem 4.8

$$A^{SSH}(n) = \frac{(1-p_1) + \sum_{i=1}^{r} n_i\left(1 - \sum_{h=1}^{i} c_{h,h}\right)}{1 - \sum_{h=1}^{r} c_{h,h}}.$$

Lemma 4.9. The adjusted weight $A^{SSH}(n)$ can be computed using $O(r^2)$ operations.

Proof. The proof follows from Lemma 4.7 and Theorem 4.8.

4.2 Adjusted Weights for Hybrids

Unbiased adjusted weights for hybrid-aSH and hybrid-sSH are obtained by scaling $p_{base}^{-1}$ the adjusted weights computed for the non-hybrid variant that is applied to the $p_{base}$-sampled stream.

4.3 Adjusted Weights for sNF $d_{ij}$ (p,n) ($2 \leq i \leq j \leq r$) is defined as follows.

$$2 \leq j \leq r : d_{2,j} = \left(\frac{p_1 - p_j}{p_1}\right)^{n_1} \prod_{h=1}^{r} p_h^{n_h}$$

$$3 \leq i \leq j \leq r : d_{i,j} = \left(\frac{p_{i-1} - p_j}{p_i - 1}\right)^{n_{i-1}} (d_{i-1,j} - d_{i-1,i-1})$$

For ($2 \leq i \leq j \leq r$), $d_{ij}$ (p, n) is the probability that all packets of the flow n have rank values below the sampling rate at packet arrival time, that the flow is fully counted by sNF until the transition into step i, and that at the beginning of step i, the rank of the flow is at least $p_j$.

The probability that all packets are counted by sNF is equal to $\Pi_{h=1}^{r} p_h^{n_h}$ minus the probability that the counting halts at the transition into steps $2, \ldots, r$:

$$q^{sNF}[n|n] = \prod_{h=1}^{r} p_h^{n_h} - \sum_{j=2}^{r} d_{j,j}. \quad (Eq.\ 4)$$

Theorem 4.10.

$$A^{sNF}[n] = \frac{\sum_{j=1}^{r} \frac{n_i}{p_j}\left(\prod_{h=1}^{r} p_h^{n_h} - \sum_{l=2}^{j} d_{l,l}\right)}{\prod_{h=1}^{r} p_h^{n_h} - \sum_{j=2}^{r} d_{j,j}}$$

The proof of the Theorem is provided in Section 9.3.

The partial sums $\Sigma_{h=1}^{i} d_{h,h}$ for $i=1, \ldots, r$ can be computed in $O(r^2)$ operations, and therefore, using Theorem 4.10 the adjusted weight $A^{sNF}[n]$ can be computed in $O(r^2)$ operations.

Theorem 4.4 is an immediate corollary of the above (for sNF) and Lemma 4.9 (for sSH), using Lemma 4.5. (According to Lemma 4.5, when q[n|n] and the $c_{ij}$'s or $d_{ij}$'s are computed, all entries which are 0 in n (except for the last entry in n which remains even if it is 0) can be removed from n and p.)

4.4 Relation Between the Sketching Algorithms

The rank-based view shows that the distribution over subsets of flows included in the sketch is the same for aNF, aSH, sNF, sSH. The different algorithms applied with the same rank assignment result in the same set of k cached flows (or all flows if there are fewer than k distinct flows in the packet stream). The hybrid algorithms result in "almost" the same distribution: if the $p_{base}$-sampled packet stream contains fewer than k distinct flows then the sketch will only include those flows, but the included flows are a subset of the flows included in a sketch generated by the non-hybrid algorithms using the same underlying assignment.

This distribution is equivalent to weighted sampling without replacement of k flows (ws) (see, e.g. [6, 7]). Ws is performed as follows over the set of aggregated flows: repeatedly, k times, a flow is selected from the set of unsampled flows with probability proportional to its weight. Adjusted weights for Ws can be obtained using the rank conditioning or subset conditioning methods [4, 5]. These weights are computed using the exact packet count of each flow and therefore can not be obtained by a stream algorithm with size-k flow cache. These ws sketches are included in the evaluation in order to understand to what extent performance deviates in comparison. The rank-conditioning adjusted weight assigned to each flow is equal to its weight (the number of packets) divided by the probability that the flow is included in the sample in some probability subspace that includes the current sample. (This is the Horvitz-Thompson unbiased estimator obtained by dividing the weight of the item by the probability that it is sampled.) The probability subspace is defined as all runs that have the same effective sampling rate p' and therefore the probability is equal to $1-(1-p')^{|f|}$, where |f| is the number of packets in the flow and p' is the effective sampling rate. Therefore, the adjusted weight is equal to $|f|/(1-(1-p')^{|f|})$.

Since these algorithms (see Table 1) share the same distribution, the difference in estimate accuracy stems from the adjusted weight assignment. The quality of the assignment depends on the information the algorithm gathers and the method applied to derive the adjusted weights. When the adjusted weights have smaller variance, the estimates obtained are more accurate. The relation of estimate quality between the different estimators/algorithms has been explored.

TABLE 1

Methods that obtain a sketch of size k that is a weighted sample without replacement from the set of flows F.

| alg | sketch size | active counters | counts collected |
|---|---|---|---|
| ANF | k | k | for k flows |
| ASH | k | k | for k flows |
| SNF | k | k | per-step for k flows |
| SSH | k | k | per-step for k flows |
| WS | k | |F| | for all flows in F |

4.5 Covariances

An important property of the algorithms considered is zero covariances:

Lemma 4.11. Consider $L \in \{aSH, aNF, sSH, sNF, NF, SH\}$ and two flows $f_1 \neq f_2$. Then $COV(A^L(f_1), A^L(f_2))=0$.

(The proof is provided in Section 9.4.)

The zero covariance property is trivial for fixed-rate sampling (NF or SH), since each flow is selected independently. With the adaptive algorithms, however, the adjusted weights are not independent since inclusion of one flow makes it less likely for the other flow to be included. For ws, this property is established in [4].

The zero covariance property of the random variables $A^L(f)$ (f∈F) implies that:

Corollary 4.12. For any $J \subset F$ and $L \in \{\text{aSH, aNF, sSH}\}$ $$\text{VAR}(A^L(J)) = \text{VAR}\left(\sum_{f \in J} A^L(f)\right) = \sum_{f \in J} \text{VAR}(A^L(f)).$$

Therefore, to show that an adjusted weight assignment has lower variance than another on all subpopulations, it suffices to show lower variance on all individual flows.

4.6 Variance of Adjusted Weights

An algorithm dominates another, in terms of the information it collects on each sketched flow, if its output can be used to emulate an output of the second algorithm. It is not hard to see that sNF dominates NF, that sSH dominates both aSH and sNF (and therefore also dominates NF), that sNF and aSH are incomparable, and that they are all dominated by ws. Therefore, sSH sketches are the most powerful and aNF sketches are the least powerful. The variance of the adjusted weight assignments rejects this dominance relation, with lower variance for the methods that gather more information.

Theorem 4.13. For any packet stream and any flow f, the following relation between the variance of the adjusted weight assignments for f holds.

$$\text{VAR}(A^{WS}(f)) \leq \text{VAR}(A^{sSH}(f)) \leq \text{VAR}(A^{aSH}(f)) \leq \text{VAR}(A^{aNF}(f)) \quad \text{(Eq. 5)}$$

$$\text{VAR}(A^{sSH}(f)) \leq \text{VAR}(A^{sNF}(f)) \leq \text{VAR}(A^{aNF}(f)) \quad \text{(Eq. 6)}$$

The proof is provided in Sections 9.2 and 9.3. The relation also holds to the fixed-rate variants of the algorithms (when the sampling rate or rate steps are fixed).

A variance relation also holds for the hybrids: the variance is non-increasing with the packet-processing rate $p_{base}$.

4.7 Estimators with Negative Covariances

The adjusted weights assignments $A_p^L(n)$ were a function of the observed counts of the flow and the "sampling rate" (or sampling rate steps). Estimators that utilize different information are considered: the counts collected for other flows in the sketch and the total packet count of the stream.

The selectivity of a packet is $1/w(F)$, selectivity of a flow is $\rho(f)=w(f)/w(F)$, and the selectivity of a subpopulation J is $\rho(J)=w(J)/w(F)$. When the total weight w(F) is known, subpopulation weight and selectivity queries are equivalent: An estimator for subpopulation weight is obtained by multiplying the subpopulation selectivity estimator with w(F) and vice versa, by dividing the adjusted weight estimator with w(F).

Adjusted selectivities, $R^L(\ )$ are unbiased estimators for selectivity. Adjusted selectivity estimators are derived for the adaptive algorithms that are based on the observed counts of all flows but do not depend on w(F). Adjusted weight assignments $A^{+L}(\ )$ are derived for the adaptive algorithms that depend on w(F), and the observed counts of all flows.

Estimators for aNF and aSH sketches are derived. (Estimators for sNH and sSH sketches can be obtained using the same methodology.) The per-packet adjusted weights are stated, as this is a more general form (proofs are provided in Section 9.6).

$$A^{+aNF}(v, n:F, w(F)) = \frac{w(F)}{n(F)}$$

if the packet v is counted and 0 otherwise.

$$R^{aNF}(v, n(F)) = \frac{1}{n(F)}$$

if the packet v is counted and 0 otherwise.
For ASH, $$A^{+aSH}(v, n:F, w(F)) = \frac{w(F) - n(F) + k}{k},$$

if v is the first-counted packet of a flow.
$A^{+ASH}(v, n: F, w(F))=1$, if v is counted but is not the first-counted packet of a flow.
$A^{+ASH}(v, n\ F, w(F))=0$, if v is not counted.

Adjusted weight assignments can be incomparable. An assignment $A_1(f)$ is considered to be at least as good as $A_2(f)$ if $A_1(\ )$ has at most the variance of $A_2(\ )$ on any subpopulation. A sufficient condition is that for all f∈F, $\text{VAR}(A_1(f)) \leq \text{VAR}(A_2(f))$ and for all $f_1 \neq f_2$, $\text{COV}(A_1(f_1), A_1(f_2)) \leq \text{COV}(A_2(f_1), A_2(f_2))$.

The adjusted weights assignments $A^{+L}(f)$ are such that
1. For each f, $\text{VAR}(A^{+L}(f)) < \text{VAR}(A^L(f))$,
2. For $f_1 \neq f_2$, $\text{COV}(A^{+L}(f_1), A^{+L}(f_2)) \leq 0$, and
3. $\Sigma_{f_1 \in F} \Sigma_{f_2 \in F} \text{CoV}(A^{+L}(f_1), A^{+L}(f_2)) = 0$. $(A^{+L}(F) \equiv w(F))$.

These properties imply that $A^{+L}(f)$ is better than $A^L(f)$ (at least as good on any subpopulation and better on some subpopulations). A case for these properties was made in [4, 5] for aggregated data, where there is a similar use of the total weight of the dataset to derive tighter estimators with negative covariances between subsets and zero sum of variances. These properties are also motivated by an interesting relation that shows that the variance of an "average" subset is a linear combination of the variance of the sum and the sum of variances [21].

These properties can not be obtained for fixed-rate sampling algorithms such as NF and SH: Since there is positive probability of an empty sample, it is not possible to have (unbiased) adjusted weights such that $A^{+L}(F) \equiv w(F)$. The relation $A^{+L}(F) \equiv w(F)$ is immediate from the definitions and the variance relations are established in Section 9.6.

5. FSD Estimators

A flow attribute that is lost when there is no pre-aggregation is the size of the flow (exact number of packets or bytes). This could be an important attribute for some aggregations, for example, to trace the origin of port scanning or worm activity one may want to aggregate over all flows that originate from a certain AS and have at most 10 packets. One also may want to estimate the number of flows in a subpopulation that are within a certain range of sizes.

FSD estimation is facilitated by assigning adjusted FSD estimators $\alpha_i^L(\ )$ (i≧1) such that for any flow f, $E(\alpha_{|f|}^L(f))=1$ and for i≠|f|, $E(\alpha_i^L(f))=0$. Similarly to adjusted weights, $\alpha_i^L(\ )=0$ for flows that are not included in the sketch. An unbiased estimator of the number of flows of size i in a subpopulation J is $\Sigma_{f \in J} \alpha_i^L(f)$. By summing the estimators $\alpha_i^L(\ )$ over a desired range of values i∈R, unbiased estimates for the number of flows in this range in the subpopulation are obtained.

An important special case is the total number of flows in a subpopulation, which can be estimated using adjusted counts $\#^L()$ (for any flow f, $E(\#^L(f))=1$). Adjusted counts from adjusted FSD estimators can be obtained using $\#^L(p, n) = \Sigma_{i>1}\alpha_i^L(p, n)$.

L∈{NF, ANF} Let $O_i$ be the random variable representing the number of flows of count i with NF (or ANF). Let p be the sampling rate (or effective sampling rate), and let $C_i$ be the number of flows of weight i.

For $i \geq 1$, the expectation of $O_i$ is $p^i C_i + i(1-p)p^{i+1} C_{i+1} + \ldots = \Sigma_{j \geq i}\binom{j}{i}p^i(1-p)^{j-1}C_j$. Therefore, the inverse of the matrix with entries $\binom{j}{i}p^i(1-p)^{j-i}$, expresses each $C_j$ as a linear combination of $E(O_i)$'s, and provides unbiased estimators [15, 9]. The entries of this inverted matrix are the FSD estimators $\alpha_j^L(p, i)$. The resulting estimators, however, are not well behaved [9]. Better estimators that use the TCP syn flag were proposed in [9].

L∈{SH, ASH} A similar derivation is used for adjusted FSD estimators for SH and ASH. These estimators can assume negative values, but are well behaved. Let $O_i$ be the random variable representing the number of flows of count i, p is the sampling rate, and $C_i$ be the number of flows of weight i.

Lemma 5.1. $\hat{C}_i = O_i/p - O_{i+1}(1-p)/p$ is an unbiased estimate of the number of flows of size i.

Proof The expectation of $O_i$ is $C_i p + C_{i+1}(1-p)p + C_{i+2}(1-p)^2 p + \ldots = \Sigma_{j \geq i}C_j(1-p)^{j-i}p$ Therefore, the expectation of $O_i/p - O_{i+1}(1-p)/p$ is $C_i$.

The respective nonzero coefficients are $\alpha_j^L(p, j)=1/p$ and $\alpha_j^L(p, j+1)=-(1-p)/p$ for $j \geq 1$.

The estimator for the total number of flows is $O_1/p + \Sigma_{i>1}O_i$, which corresponds to the adjusted counts $\#^{ASH}(p, 1)=1/p$ and $\#^{SH}(p, i)=1$ for $(i>1)$.

For ASH (proof provided in Section 9.6) tighter estimators are obtained. Let n(f) be the number of counted packets for flow f.

$$\hat{C}_i = (1 + \frac{w(F)-n(F)}{k})O_i - \frac{w(F)-n(F)}{k}O_{i+1}.$$

The respective nonzero FSD estimators are $$\alpha_j^{ASH}(f, n:F, w(F)) = \frac{w(F)-n(F)+k}{k}$$

if $n(f) = j$ and $\alpha_j^{ASH}(f, n:F, w(F)) = -\frac{w(F)-n(F)}{k}$ if $n(f) = j+1$.

The resulting estimator for adjusted count is $$\#^{ASH}(f) = \frac{w(F)-n(F)+k}{k}$$

if $n(f) = 1$ and 1 otherwise.

sSH The sSH adjusted FSD estimators are more accurate (have smaller variance) than those obtained using SH and ASH sketches. Let $O_s$, be the random variable representing the number of flows with observed count vector s.

Lemma 5.2. Let n be the observed count and $p=(p_1, \ldots, p_r)$ the corresponding sampling rate steps. Assume WLOG that $n_r>0$ for $1 \leq l < r$. The following are the correct adjusted FSD estimators $\alpha_i^{sSH}(p, n)$ $(i \geq 1)$. Only the nonzero values are stated.

If $|n|=1$, $\alpha_1^{sSH}(p, n)=1/p_r$. Otherwise,

If $n_r=|n|>1$ (there is only one step and it is the last one) then $\alpha_{|n|}^{sSH}(p, n)=1/p_r$ and $\alpha_{|n|-1}^{sSH}(p, n)=-(1-p_r)/p_r$.

For $l=3, \ldots, r-1$, for $l=2$ if $n_1>1$, and for $l=n_r>0$:

$$\alpha_{\Sigma_{h=l}^r n_h}^{sSH}(p, n) = \frac{-c_{l,l}}{q^{sSH}[n|n]}.$$

If $n_1 = 1$, $\alpha_{\Sigma_{l=2}^r n_h}^{sSH}(p, n) = \frac{-(1-p_2)}{q^{sSH}[n|n]}$.

If $n_1 > 1$, $\alpha_{-1+\Sigma_{h=1}^r n_h}^{sSH}(p, n) = \frac{-(1-p_1)}{q^{sSH}[n|n]}$ $$\alpha_{\Sigma_{h=1}^r n_h}^{sSH} = \frac{1}{q^{sSH}[n|n]}$$

The proof is deferred to Section 9.5.

Using the relation $\#^{sSH}(p, n)=\Sigma_{i \geq 1}\alpha_i^{sSH}(p, n)$ and Eq. (3), the following adjusted counts are obtained:

Corollary 5.3. If $|n|=1$, $\#^{sSH}(p, n)=1/p_r$.

If $n_r \geq 1$ and $|n|>1$, $\#^{sSH}(p, n)=1$.

If $n_r=0$, $|n|>1$, let $l<r$ be the last step with a positive packet count.

$$\#^{sSH}(p, n) = 1 + \frac{c_{l+1,r}}{q[n|n]}.$$

(If all steps but the last have nonzero counts, then $\#^{sSH}(p, n)=1+c_{r,r}/q[n|n]$.)

Expressions for adjusted counts can be derived directly through the methods developed for adjusted weight derivation (see Section 9). As is the case for adjusted weights, there is a unique adjusted counts function $\#^L(p, n)$. For L∈{NF, ANF}, using the unbiasedness constraints, it is obtained that the adjusted counts are the solution of the triangular system of linear equations: For a flow with count $|f|$ $$\sum_{i=0}^{|f|}\binom{|f|}{i}p^i(1-p)^{|f|-i}\#^L(p, i) = 1.$$

Adjusted FSD estimators are computed based on the step-counts and therefore to facilitate FSD estimation, they need to be computed before the step-counts are discarded.

Hybrid algorithms The existing FSD estimators for NF sketches [15,9] and ASH and sSH sketches are used as components.

For hybrid-ASH (or hybrid-sSH), the respective (ASH or sSH) estimators are applied to the counts obtained on the $p_{base}$-sampled stream. Unbiased estimates $\alpha_j(J)$ (j>1) are obtained for the number of flows of size j in the subpopulation J in the $p_{base}$-sampled stream. These $\alpha_j(J)$ values are then "treated" as observed counts with NF with sampling rate $p_{base}$, and are "plugged" in the NF FSD estimator. Unfortunately, since the NF estimators are ill behaved for low sampling rates, these estimators are ill behaved for low values of $p_{base}$.

Lemma 5.4. The resulting estimates $\hat{C'}_i(i \geq 1)$ are unbiased estimates of the number of flows of size i in the original stream.

Proof The NF FSD estimators are derived by expressing $O_j(j \geq 1)$, the expected number of flows with a certain observed counts as a linear combination of $C_i(i>1)$, the number of flows of size i. The matrix is then inverted, and each $C_i$ is expressed as a linear combination of the expectations of the observed counts. The estimators $\hat{C}_i$ are linear combinations of the observed counts. Since this is a linear combination, the observed counts can be replaced with any other random variables with the same expectation and unbiased estimators $\hat{C}'_i$ are still obtained.

6 Estimating Other Aggregates

The sketches support estimators for aggregates of other numeric flow properties over a queried subpopulation. Flow-level and packet-level properties are distinguished.

6.1 Flow-level Properties

A numeric property h(f) of the flow f is classified as flow level if it can be extracted from any packet of the flow and some external data (therefore, h(f) for all the flows that are included in the sketch is known). Examples are the number of hops to the destination AS, unity (flow count), and flow identifiers (source or destination IP address and port, protocol). Flow-level properties can be aggregated per-packet or per-flow.

Per-packet aggregation. For a subpopulation $J \subset F$, the per-packet sum of h( ) over J is $\Sigma_{f \in J} w(f) h(f)$.

The per-packet average is $$\frac{\sum_{f \in J} w(f) h(f)}{\sum_{f \in J} w(f)}.$$

If h(f) is the number of AS hops traveled by the flow f then the per-packet sum is the total number of AS hops traveled by packets in the subpopulation J and the per-packet average is the average number of hops traveled by a packet in J. If h(f) is unity, the per packet sum is the weight of the subpopulation. It is not hard to see that for a sketch with unbiased adjusted weights, $\Sigma_{f \in J} A(f) h(f)$ is an unbiased estimator of the per-packet sum of h( ) over J. (A (possibly biased) estimator for the per-packet average is $$\frac{\sum_{f \in J} A(f) h(f)}{\sum_{f \in J} A(f)}.)$$

Per-flow aggregation. The per-flow sum of h( ) over J is $\Sigma_{f \in J} h(f)$. The per-low average of h( ) over J is $\Sigma_{f \in J} h(f)/|J|$. If h(f)≡1, the per-flow sum is the number of distinct flows in a subpopulation. If h(f) is the number of AS hops then the per-flow average is the average "length" of a flow in J.

The generic estimator for per-flow sums is based on adjusted counts. For each f∈F, E(#(f)h(f))=h(f), therefore $$\sum_{f \in J} \#(f) h(f) = \sum_{f \in J \cap S} \#(f) h(f)$$

is an unbiased estimator of the per-flow sum of h( ) over J.

6.2 Packet-level Properties

Packet-level properties have numeric h( )-values that are associated with each packet. For a flow f the h( )-value of f is defined as $h(f) = \Sigma_{c \in f} h(c)$. If h(c) is the number of bytes in the packet c then h(f) is the number of bytes in the flow. If h(c) is unity, then h(f)=w(f) is the number of packets of the flow, h(f) is available only if all packets of f are processed and therefore is not provided for flows included in NF and SH variants sketches.

The algorithms are adapted to collect information needed to facilitate unbiased estimators. For any desired packet-level property h( ), adjusted h( )-values $H_p^L(f)$ are produced. For any f, H(f) is an unbiased estimator of h(f) and H(f)=0 for flows that are not included in the sketch. For any subpopulation J, $\Sigma_{f \in J} H(f) = \Sigma_{f \in J \cap S} H(f)$ is an unbiased estimator for $\Sigma_{f \in J} h(f)$.

L∈{NF, ANF}: Let N(f) be the set of counted packets and let n(f) be the packet count maintained by L for a cached flow f. To facilitate h( )-values estimation, the algorithm maintains the h( ) counts $n^{(h)}(f) = h(N)$. The adjusted h( )-value is $H_p^L(f) = n_{(h)}(f)/p$. A subtle point is correctly updating n(h) for ANF when performing rate adaptation. The updated value should include the sum of the h( ) values of resampled packets which if strictly done, requires storage of the h( ) value of all packets in N(f), which is prohibitive. However, it is sufficient to store the total $n^{(h)}(f)$ and update it proportionally to the reduction in the packet count n(f). That is, if resampling reduces the packet count to n'(f), the h( )-count is updated $n^{(h)}(f) \leftarrow n^{(h)}(f) n'(f)/n(f)$.

The updated $n^{(h)}(f)$ is the expectation of the updated h( ) count that would have been obtained if N and per-packet h( ) values were explicitly maintained and sampled from N a subset of size n'(f). (All subsets of N(f) that are of the same size have the same probability of being in the resample, regardless of the packet position or its h( ) value.)

This consideration extends to a sequence of rate adaptations: The final n(h)(f) has the expectation of the h( ) count over all resamples that resulted in the same sequence of packet count reductions. Interestingly, done this way, a lower variance estimator is obtained than if per-packet h( ) values for N(f) had been maintained and used, as the h( ) count used is the expectation of the latter in each part of a partition of the sample space.

L∈{SH, ASH}: the unbiased estimator is obtained $$H^{\text{ASH}}(f) = h(c_0(f)) \frac{1-p}{p} + h(N(f)),$$

where N(f) is the set of counted packets of f and $c_0(f) \in N(f)$ is the first counted packet off. To facilitate this estimator, the algorithm needs to record the h( ) value of the first packet and the sum of h( ) values of all subsequent packets. For ASH, the resampling makes a direct implementation infeasible, as per-packet h( ) values for all packets in N are required to be recorded. Averaging can not be used as for ANF, since later packets are more likely to be counted than earlier packets. Fortunately, there is efficient implementation for sSH.

L∈{sNF, sSH}: To facilitate estimators, the algorithms need to maintain per-step h( ) counts, $h(N_1), h(N_2), \ldots, h(N_r)$, where $N_i$ is the set of packets counted in step i. For sSH, the h( ) value of the first packet $c_0$ when the flow enters the cache is also needed to be maintained. The expressions for adjusted h( ) values are provided in Eq. (9) (for sSH) and Eq. (24) (for sNF).

Hybrid SH variants: Adjusted h( ) values for the sampled stream are obtained and scaled by $p_{base}^{-1}$.

6.3 Sketches for Byte Counts

Byte counts can be estimated using a sketch built to estimate packet counts, but if byte counts are the main application, then SH variants can be adapted to estimate bytes directly instead of packets: The count values are applied to bytes and are captured as follows. If a packet belongs to a cached flow, the number of bytes is added to the active counter. Otherwise, the geometric distribution is used to determine what part of a packet (if at all) should be counted. For a continuous variant of this process, the exponential distribution can be used.

7. Implementation Design Using Discretized Sampling Rates

In one embodiment, the present invention provides an alternative to the pure models that addresses important practical implementation issues. The first is the number of rate adaptations performed. The second is the implementation of each rate adaptation, namely, the tracking of flow ranks that determines which flows are evicted and how counts are adjusted. It has been established that the discretized version preserves important properties of the pure model that allow for unbiased estimation and for other properties of the variance of the adjusted weights to carry over.

The discretized algorithm uses three tunable parameters that can be set by the router manufacturer. The first is $p_{base} \leq 1$ that determines the fraction of packets that are processed. The second is $p_{start} \leq p_{base}$ that determines the initial sampling rate. The third parameter is $0 < \mu < 1$ which controls the discretization of the sampling rates.

The number of rate-adaptations is a performance factor for all adaptive algorithms. Executing each adaptation is an intensive operation and therefore it is desirable to both limit the number of rate-adaptations and to carefully implement them [11]. For the step-counting algorithms, the number of rate adaptations also affects the size of intermediate storage and the computation of the adjusted weights (which depend on the number of rate-steps in which an actively-counted flow had a nonzero count).

The pure models perform a rate adaptation to evict a single cached flow at a time. It follows from the rank-based view that all adaptive algorithms (aNF, aSH, sNF, and sSH) perform the same rate adaptations. Rate adaptation occurs when the current sampling rate (the (k+1)st-smallest rank value of a flow) decreases. This happens when the cache is full (has k flows) and a sampled packet (equivalently, packet with rank value which is smaller than the current sampling rate) does not belong to a cached flow. The number of rate adaptations depends logarithmically on the size of the stream, but linearly on the size of the flow cache:

Lemma 7.1. Let m be the size of the packet stream. The expected number of rate adaptations is $\leq (k+1)\ln(p_{start} m)$.

Proof. The expected number of updates to the set of cached flows for aggregated data streams is analyzed in [4, 7]. This corresponds to a situation where each flow appears as a consecutive burst and is therefore a special case of the model. The argument used in [7] for uniform weights (a stream of 1-packet flows) trivially extends to a model where there is a stream of 1-packet flows where rank values of cached flows (flows included in the current sketch) can be arbitrarily decreased at arbitrary times.

An unaggregated stream of multi-packet flows in this model is expressed as follows: Packets are processed as if they belong to a stream of 1-packet flows. Once a flow is cached, the rank value(s) of subsequent packets that belong to the flow are examined and then these packets are deleted. If the rank of the deleted packet is smaller than the current rank of its flow, an arbitrary rank decrease is simulated and the rank of the flow is decreased to that of the packet. An important point for the analysis is that packet deletion is independent of the rank of the deleted packet. The probability that the ith undeleted packet modifies the sketch (has rank value that is smaller than the (k+1)st smallest rank) is at most $\min\{1, (k+1)/i\}$. The total number of undeleted packets is at most m. Therefore, the expected number of updates is at most $$\sum_{i=1}^{m} \min\left\{1, \frac{(k+1)}{i}\right\} \leq (k+1)\ln m.$$

This bound is nearly tight for streams that consist of 1-packet flows [7], and it is $\Omega(k \ln(p_{start} m))$ (asymptotically tight) when at least a constant fraction of packets belong to small flows. Large number of small flows is common in Zipf-like data and small flows are often introduced in DDoS attacks, port or IP address scanning, and other anomalies.

The actions of a run of a discretized variant of aNF, aSH, sNF, sSH, and hybrids, are equivalent to those of the original variant except that when the flow cache overflows (there are more than k flows with current rank value that is below the current sampling rate), the sampling rate is decreased by a factor of $\mu$ until at least one flow (but in expectation at most (1−$\mu$) fraction of the flows) are evicted. Observe that the discretized implementation does not always produce sketches with k flows: The number of flows is at most k but can be smaller even if there are k or more distinct flows in the $p_{base}$-sampled stream.

A discretized rank-based view of the discretized sketching algorithms is provided. This view is equivalent to replacing sampling rates and rank values of packets and flows $x \in [0, 1]$ with $[\log_\mu(x/p_{base})]$. (Smaller values have larger discretized value.) Packets of the $p_{base}$-sampled stream are assigned discretized ranks using a geometric distribution with parameter (1−$\mu$). The discretized rank of a flow is the largest rank of a packet of the flow. The discretized current sampling rate is initially set to $[\log_\mu(p_{start}/p_{base})]$. After k distinct flows are cached, it is the (k+1)st largest discretized rank of a flow, which is equal to the largest discretized rank of a cached flow plus 1. The discretized effective sampling rate is the discretized sampling rate at the end of the measurement period. The flow counts collected over the $p_{base}$-sampled stream correspond to those for the pure model: A packet is included in the current discretized aNF count if and only if its discretized rank value is above the discretized current sampling rate. With discretized aSH, the packet is included if and only if the discretized rank of the flow after the packet is processed is above the discretized current sampling rate, and similarly for sNF and sSH.

The following property, that holds for the pure model, extends to the discretized model:

Lemma 7.2. A flow f is cached in the discretized model if and only if its discretized rank is larger than the kth largest discretized rank of the flows in $F \setminus \{f\}$. (If there are fewer than flows in $F \setminus \{f\}$ with positive discretized rank value, the flow is cached if and only if its rank is positive.)

This property is critical for extending the analysis of unbiased estimators and variance relations to the discretized model. It allows to simply "plug in" sampling rates and the respective flow counts into the unbiased estimators developed for the pure model. The subtle arguments do not carry over to other conceivable implementations of rate adaptations such as removing a constant fraction of (highest-ranked) cached flows [16, 11] without having to maintain additional state.

A side benefit of discretization is that fewer bits are needed to encode rank values of active flows, as the expected maximum discretized rank of a flow is $\log_\mu(m p_{base})$. Other advantages of such discretization, such as layered transmission of summaries, are provided in [11].

The number of rate adaptations is tuned using the parameters $\mu$ and $p_{start}$. Larger values of $\mu$ correspond to a higher number of rate adaptations but also to better memory utilization and more flows in the final sketch (the expected number of active counters and number of flows in the final sketch is about $k(1+\mu)/2$). Lower values of $p_{start}$ eliminate up to $[\log_\mu(p_{start}/p_{base})]$ rate adaptations. The counts of the step-counting algorithms are reduced by lower $p_{start}$, but if $p_{start}$ is larger than the effective sampling rate, then the sketch produced by ANF and ASH are not affected by the lower $p_{start}$. The discretized implementation has a considerably better bound on the number of rate adaptations than the pure model. In particular, the linear dependence on k exhibited by the bound obtained for the pure version, is eliminated.

Lemma 7.3. The expected number of rate adaptations performed is at most $\log_\mu(p_{start}*m)$.

An implementation of the discretized algorithms is outlined. The execution is divided into counting phases and rate adaptations (a design of [11] allows them to run concurrently).

Counting phase. Each counting phase starts with a set of statistics counters indexed by the flow attributes of cached flows and applied to the $p_{base}$-sampled packet stream. Each packet is labeled as "sampled" (again) with probability $\mu^t$, where t is the current discretized sampling rate. The following is performed: (i) If the flow is cached then: If the algorithm is one of ASH, sSH, and hybrids or the packet is labeled sampled and the algorithm is one of ANF and sNF, the respective flow counter is incremented. (With SH variants and hybrids, the packet is sampled only if the flow is not cached.) (ii) If the packet is labeled sampled and the flow is not cached, a new entry in the flow cache is created. If there are k cached flows, a rate adaptation is performed.

Rate adaptation. The adaptive algorithms, ANF, ASH, and hybrid-ASH maintain a single packet count for each cached flow. These counts are updated during the rate adaptation until at least one flow has a zero count. For ANF, the updated count is a binomial random variable with parameters μ and the current count; for ASH, with probability μ the count remains unchanged and otherwise it is a geometric random variable with parameters that are the current count minus 1 and rate $\mu^{t+1}$, where t is the current discretized sampling rate. After the counts of all cached flows are updated, the current discretized sampling rate is incremented.

The update process is repeated until at least one flow has a count of zero. (The repeated process can be avoided by storing discretized rank values for each flow as proposed next for the step-counting algorithms.) All flows with a count of zero are then evicted from the cache.

The step-counting algorithms sNF, sSH, and hybrid-sSH store a discretized rank for each cached flow. The flow ranks are updated using the counts collected in the most recent counting phase. The set of cached flows with smallest discretized rank value are then evicted. The discretized sampling rate is updated to be the discretized rank of evicted flows.

The update process of the rank of cached flows emulates the following process that assigns ranks individually to packets counted in the recent counting step. The first packet counted (SH and hybrid variants with flow that was not cached at the beginning of the phase) and all packets counted (NF variants) obtain a random rank from a geometric distribution with parameter (1−μ), conditioned on it being larger than the current discretized sampling rate. The rank of each flow is updated to be the maximum of its current rank and the ranks assigned to the packets of the flow counted at the recent counting phase.

These updates can be performed efficiently (computation steps proportional to the number of cached flows with non-empty counts at the recent step) using the exponential distribution to find the maximum discretized rank over a set of packets.

7.1 Adjusted Weights for Discretized Algorithms

Unbiased adjusted weights for the discretized algorithms are obtained by recording the discretized sampling rates for each step. Each discretized rate t is then converted to a corresponding sampling rate $(p_{start}/p_{base})\mu^t$ and plugged in the corresponding expressions for ANF, ASH, sNF, or sSH adjusted weights. For the hybrid versions ($p_{base}<1$), the adjusted weights are scaled by $p_{base}^{-1}$.

The arguments for correctness, that are based on obtaining an unbiased estimator on each part in a partition of the same space, extend to the discretized version using Lemma 7.2. If the ranks of all packets in $F\setminus\{f\}$ are fixed, the discretized sampling rate when f is counted depends only on these fixed ranks (and not on ranks assigned to previous packets of f) and is equal to the sampling rate at measurement time.

Therefore, unbiased adjusted weights can be computed while treating the effective sampling rate (for ASH and ANF) or the steps of the current sampling rate (for sNF and sSH) as being fixed.

The proofs of other properties, such as the relation between the algorithms (Section 4.4), the variance relation (Theorem 4.13), and the zero covariances (Lemma 4.11) extend to the discretized variants.

8 Simulations

Simulations are used in order to understand several performance parameters: The accuracy of the estimates derived and its dependence on the algorithms, parameter settings, and the consistency of the subpopulation, the tradeoffs of the hybrid approach, and the effectiveness of the parameters controlling the number of rate adaptations. The simulations were performed using the discretized variants of the algorithms, with parameters k (maximum number of counters), $0<p_{base}\leq 1$ that determines the fraction of processed packets (hybrid approach), and μ and $p_{start}$, that control a tradeoff between accuracy/utilization and the number of rate adaptations.

8.1 Data

Both synthetic and IP flows datasets were used. The IP flows data were collected using unsampled NetFlow (flow-level summary of each 10 minute time period that includes a complete packet count for each flow) deployed at a gateway router. A typical period has about 5000 distinct flows and 100K packets. The synthetic datasets were produced using Pareto distributions with parameters α=1.1 and α=1.5. Distributions of flow sizes were generated by drawing 5000 flow sizes. A packet stream was simulated from each distribution of flow sizes by randomly permuting the packets of all flows.

Figure 2:
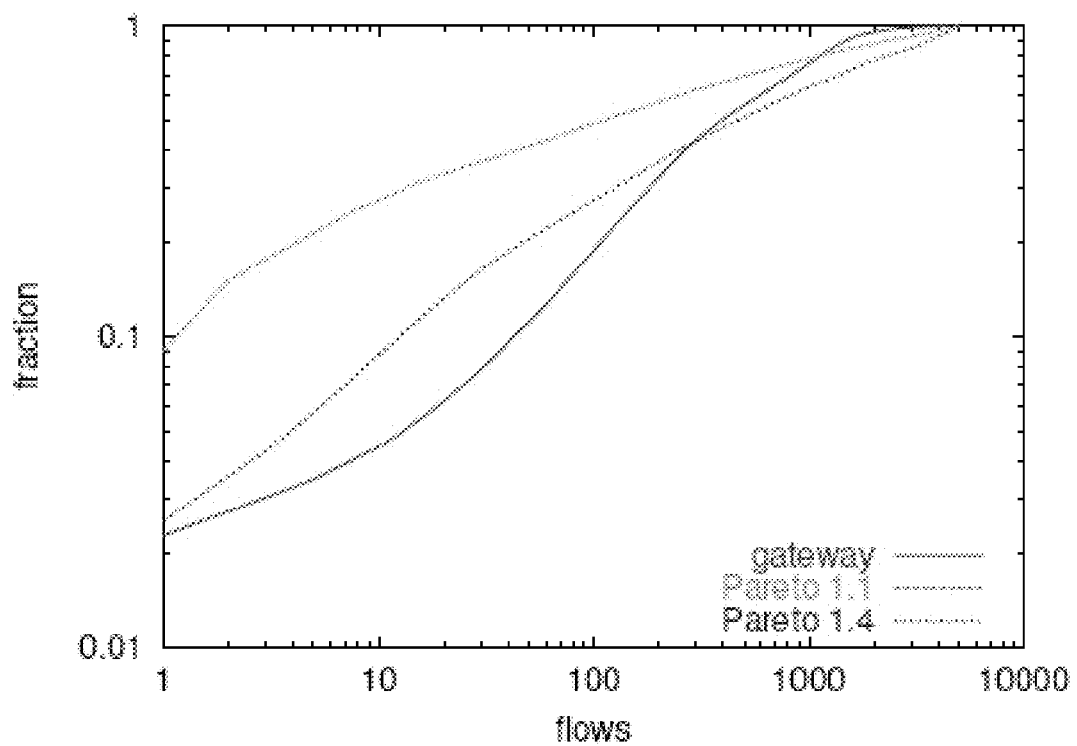
FIG. 2 shows the fraction of packets belonging to the i heaviest flows generated in the simulation described in section 8.1.

The cumulative distributions of the weight of the top i flow sizes for each distribution is provided in FIG. 2.

The subsets (subpopulations) considered for the synthetic datasets were the $2^i$ largest flows and the 50%, 30%, and 10% smallest flows. This selection enables understanding of how performance depends on the consistency of the subpopulation (many smaller flows or fewer larger flows) and the skew of the data. The subpopulations used for the IP flows (gateway) data were a partition of the flows according to destination port.

8.2 Quality of Sketches

The accuracy of subpopulation-size estimates obtained using ANF, sNF, ASH, and sSH were compared. Performance as a function of the size k of the sketch (and the size of the flow cache) was evaluated. Also included was weighted sampling without replacement.

Figure 3A:
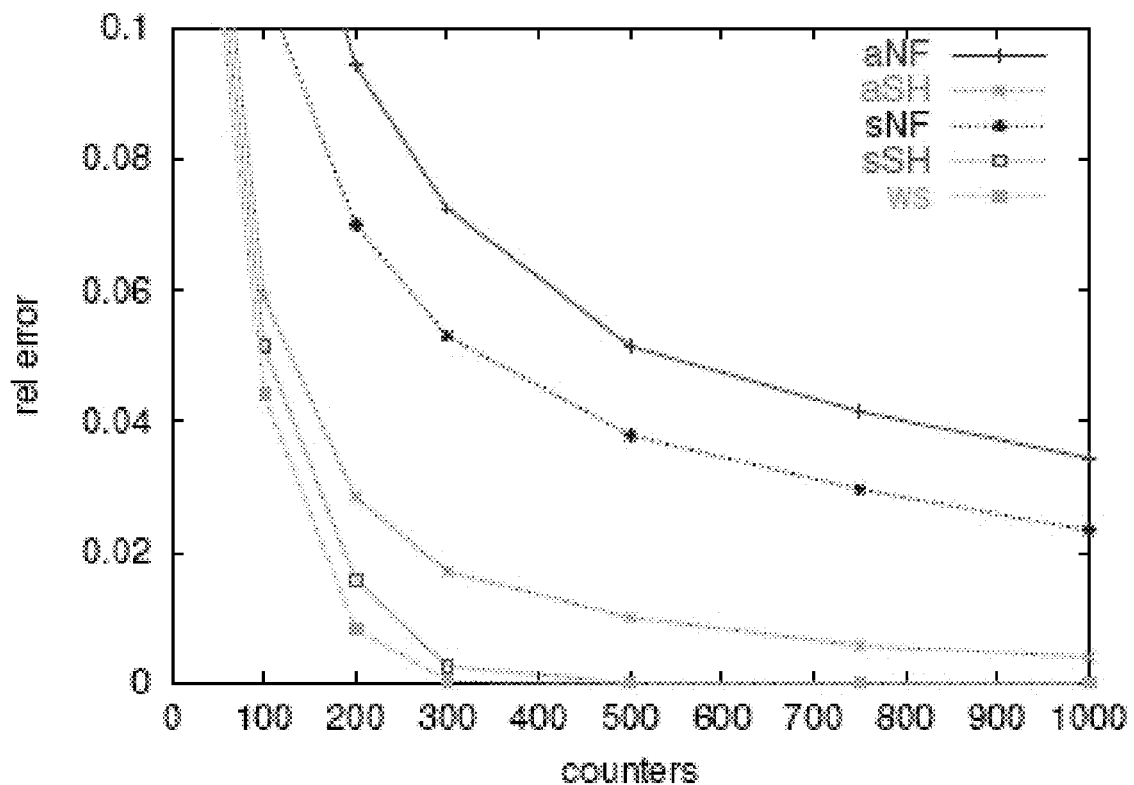
FIG. 3A shows a comparison of the accuracy of subpopulation-size estimates obtained using aNF, sNF, aSH and sSH. The subpopulations consist of top flows $p_{base}=1$, $\mu=0.9$, $p_{start}=1$, top-16. The Pareto distribution has parameter $\alpha=1.1$.
Figure 3B:
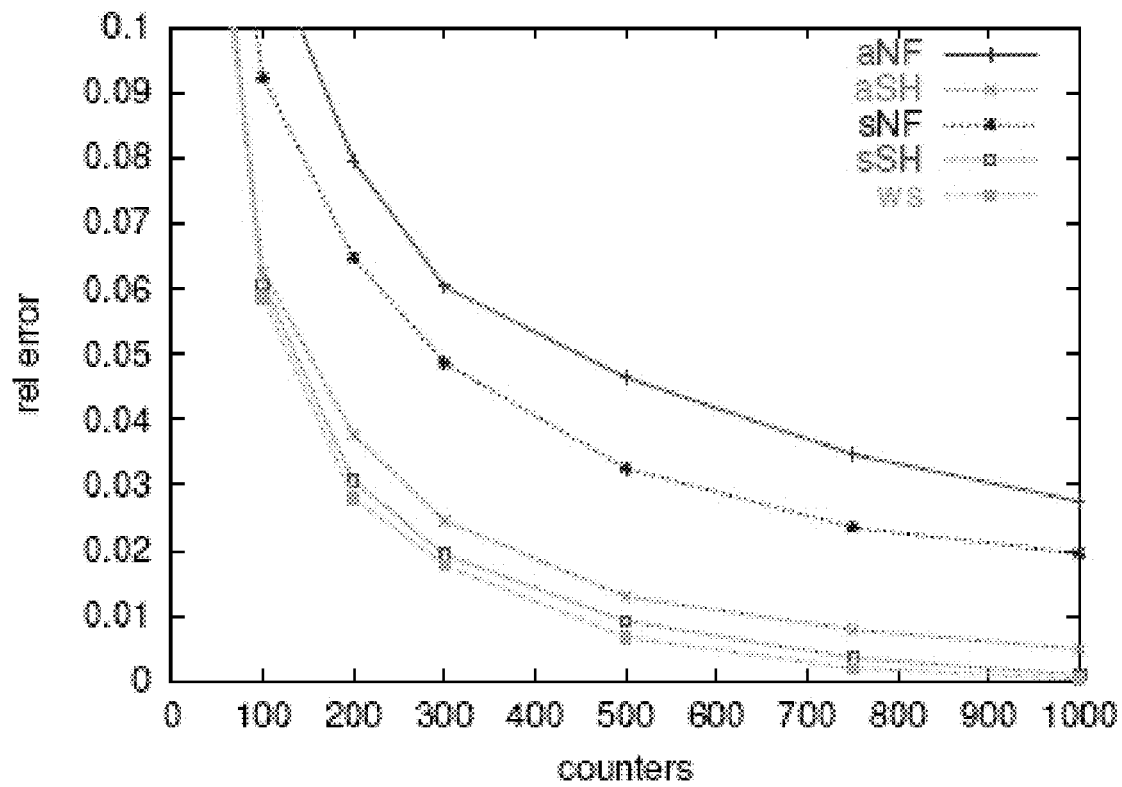
FIG. 3B shows a comparison of the accuracy of subpopulation-size estimates obtained using aNF, sNF, aSH and sSH. The subpopulations consist of top flows $p_{base}=1$, $\mu=0.9$, $p_{start}=1$, top-64. The Pareto distribution has parameter $\alpha=1.1$
Figure 3C:
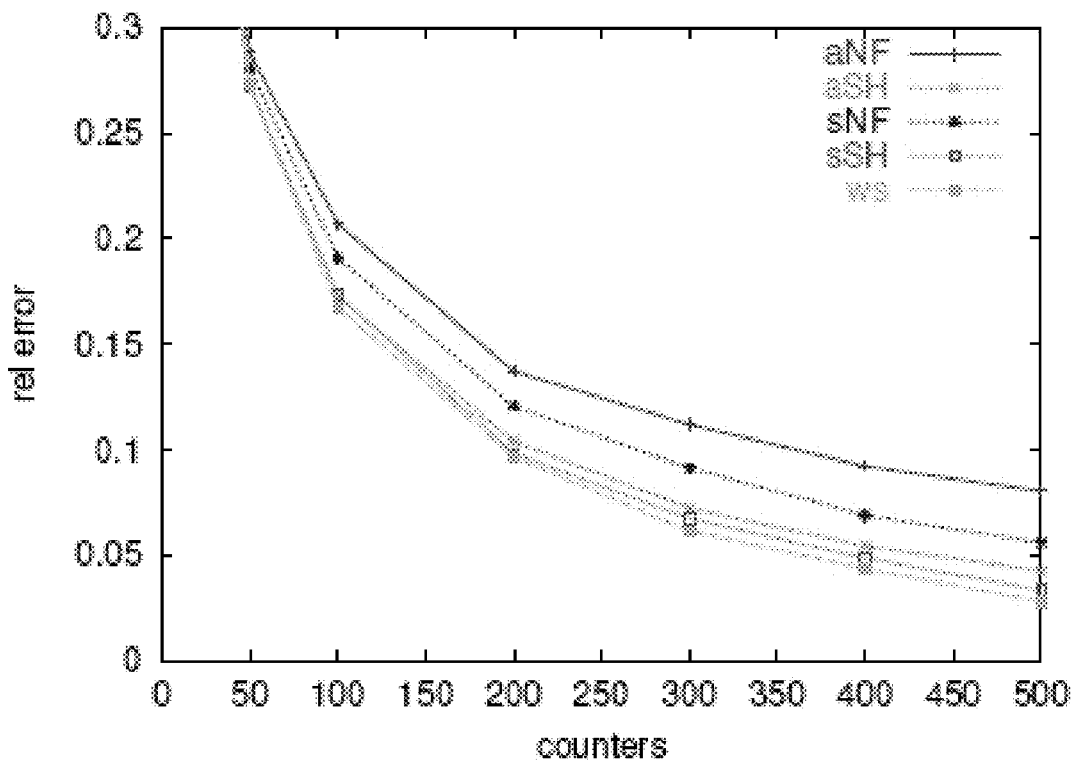
FIG. 3C shows a comparison of the accuracy of subpopulation-size estimates obtained using aNF, sNF, aSH and sSH. The subpopulations consist of top flows $p_{base}=1$, $\mu=0.9$, $p_{start}=1$, top-64. The Pareto distribution has parameter $\alpha=1.4$.
Figure 4A:
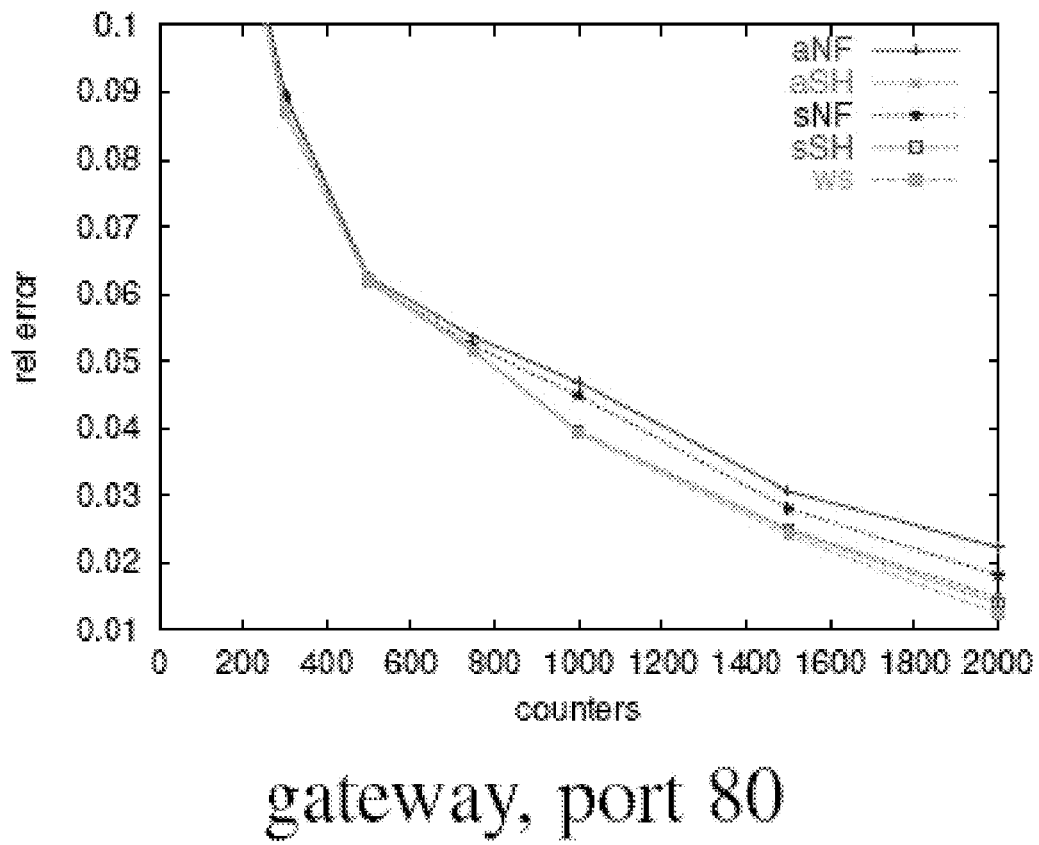
FIG. 4A shows a comparison of the accuracy of subpopulation-size estimates obtained using aNF, sNF, aSH and sSH. Estimating subpopulations of IP flows for 80 port numbers, $p_{base}=1$, $\mu=0.9$, $p_{start}=1$.
Figure 4B:
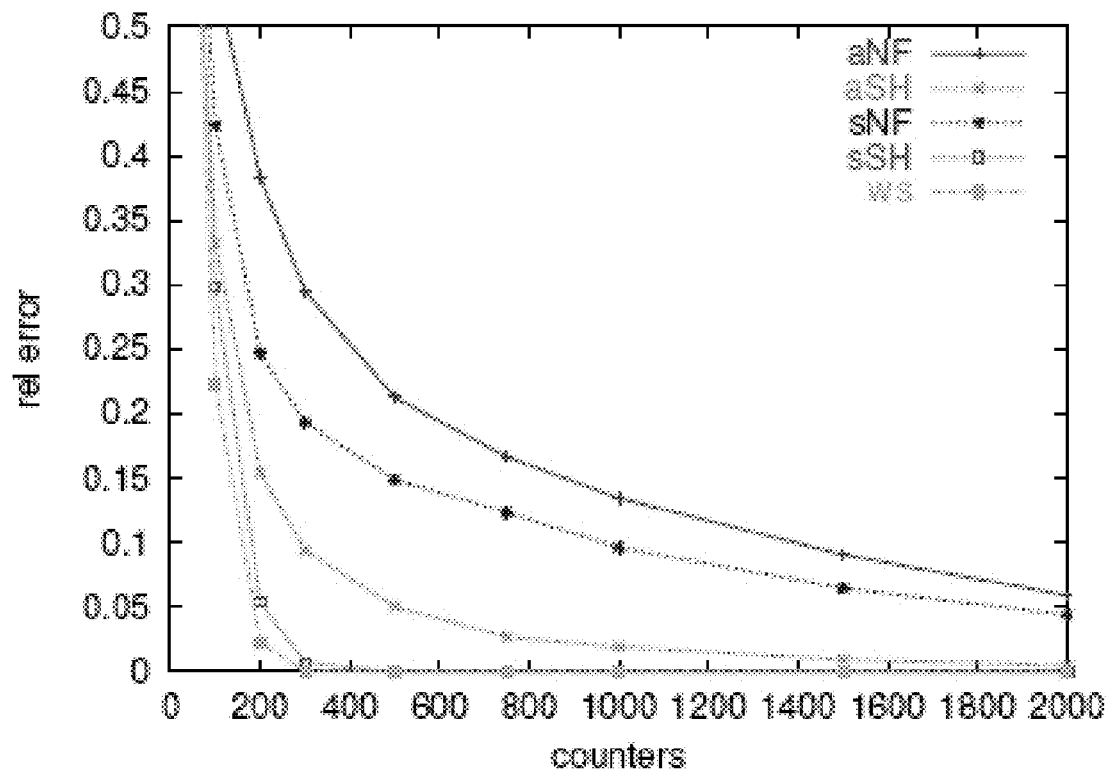
FIG. 4B shows a comparison of the accuracy of subpopulation-size estimates obtained using aNF, sNF, aSH and sSH. Estimating subpopulations of IP flows for 3818 port numbers, $p_{base}=1$, $\mu=0.9$, $p_{start}=1$.
Figure 4C:
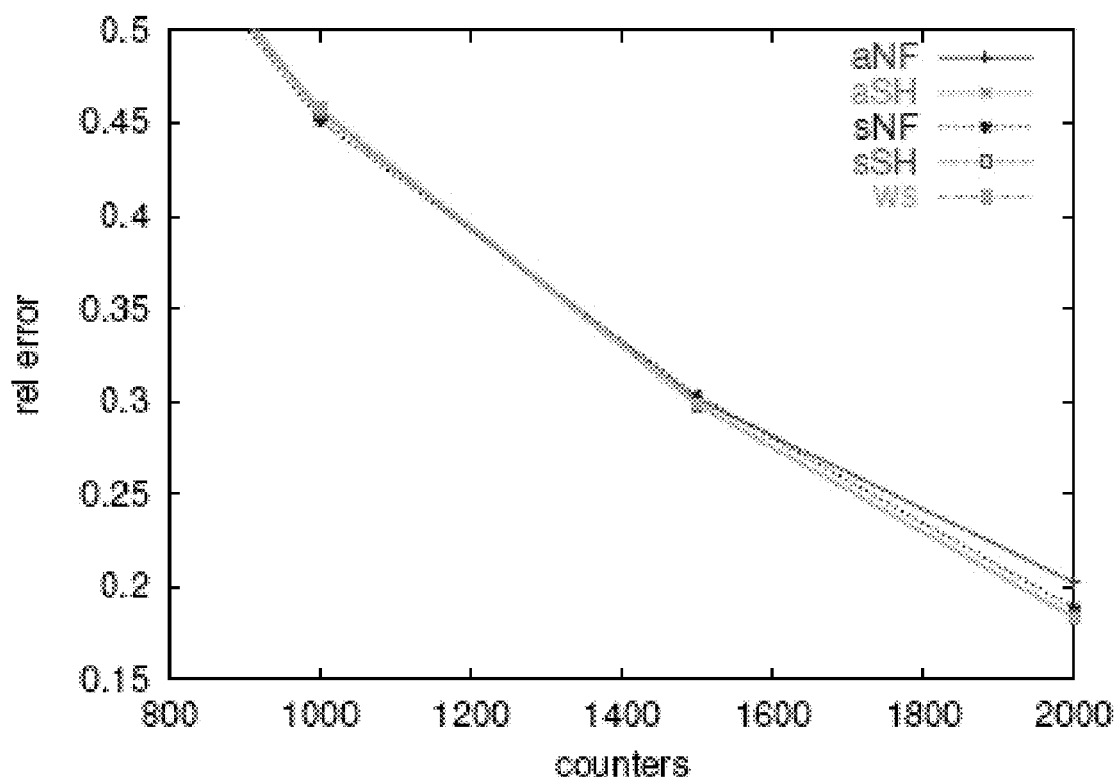
FIG. 4C shows a comparison of the accuracy of subpopulation-size estimates obtained using aNF, sNF, aSH and sSH. Estimating subpopulations of IP flows for 53 port numbers, $p_{base}=1$, $\mu=0.9$, $p_{start}=1$.

Results that show the average absolute value of the relative error as a function of the cache size k are provided in FIGS. 3 and 4. The averaging for each data point was performed over 200 runs. The figures reflect the relation established theoretically: sSH dominating ASH which in turn dominates ANF and that sNF dominates ANF. They also show that ASH dominates sNF on the data. For subpopulations consisting of large flows, such as top-i flows and applications with medium to large flows, the performance gaps are more pronounced. This is because on these flows, the more dominant methods count more packets and obtain adjusted weights with smaller variance. The adjusted weight assignments have minimum variance with respect to the information they use (the counts collected for the flow). This "optimality" enables translation of the larger counts to smaller errors.

On subpopulations of very small flows, such as bottom-50% of flows or DNS (port 53) traffic (only the latter is shown), all methods have similar performance. In particular, there is no advantage for ws (the strongest method) over ANF (the weakest) on subpopulations consisting of 1-packet flows.

The results strongly support the use of step-counting as an alternative to the adaptive variants: On subpopulations consisting of many medium to large size flows, the relative error obtained using sNF and sSH is significantly smaller than what is obtained using ANF or ASH, respectively.

8.3 Evaluation of the Hybrid Algorithms

Figure 5A:
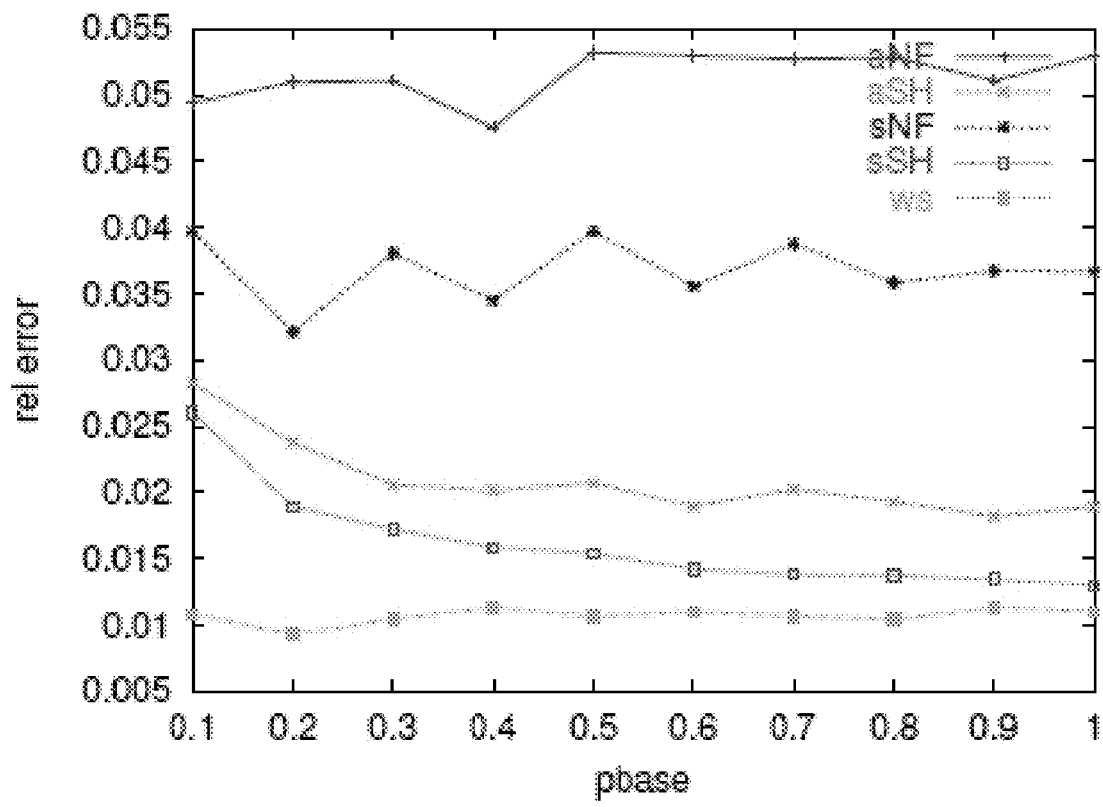
FIG. 5A shows sweeping $p_{base}$ to evaluate hybrid algorithm. Estimating subpopulations of top-64 flows for Pareto 1.1, k=400, $p_{start}=p_{base}$, $\mu=0.9$.
Figure 5B:
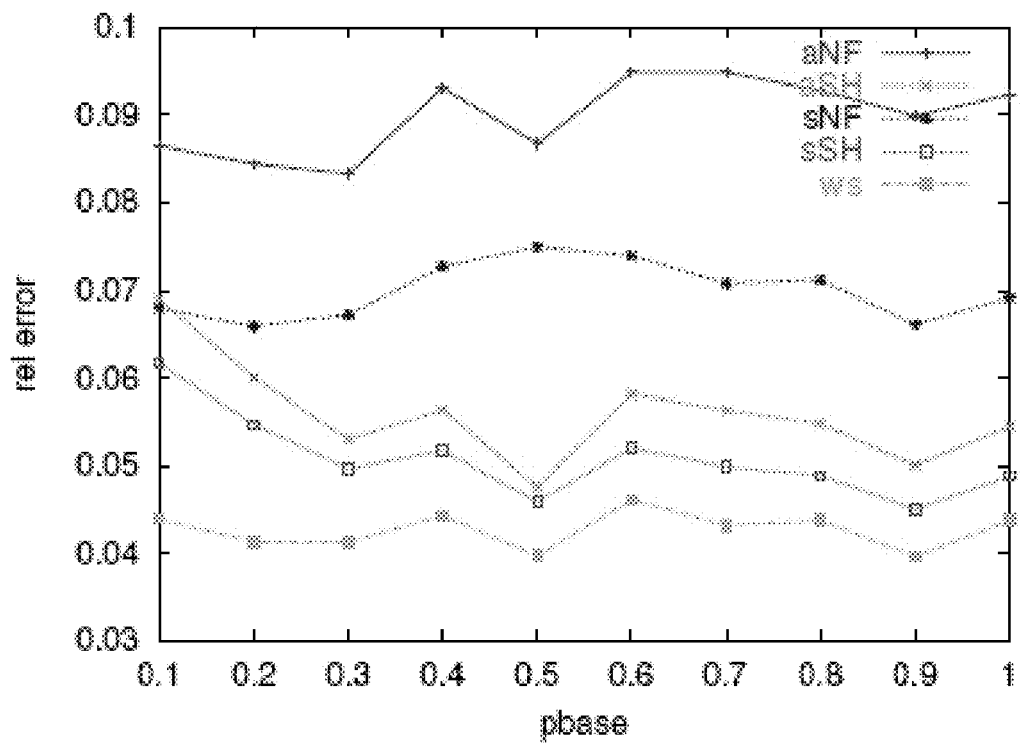
FIG. 5B shows sweeping $p_{base}$ to evaluate hybrid algorithm. Estimating subpopulations of top-64 flows for Pareto 1.4, k=400, $p_{start}=p_{base}$, $\mu=0.9$.

The parameter $p_{base}$ is decreased while maintaining the same flow cache size k=400. FIG. 5 shows that the estimate quality gracefully degrades and a smooth performance curve is obtained. Even for $p_{base}$=0.1, the hybrid-ASH and hybrid-sSH outperform ANF and sNF, respectively.

Figure 6A:
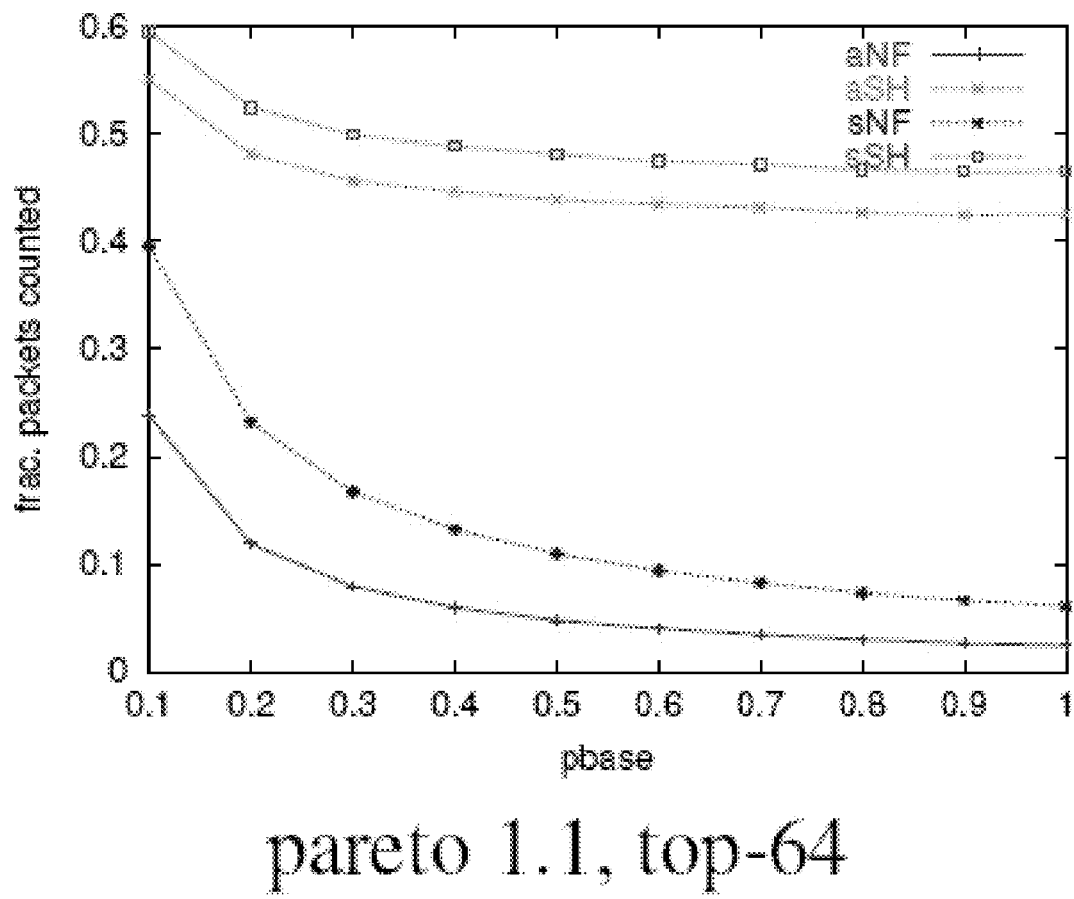
FIG. 6A shows sweeping $p_{base}$ to evaluate the tradeoffs in the hybrid algorithms. Fraction of packets in the $p_{base}$-sampled stream that are counted (left). Fraction of total packets that are counted (right). The figure shows subpopulations of top-64 flows for Pareto 1.1, k=400, $p_{start}=p_{base}$, $\mu=0.9$.
Figure 6B:
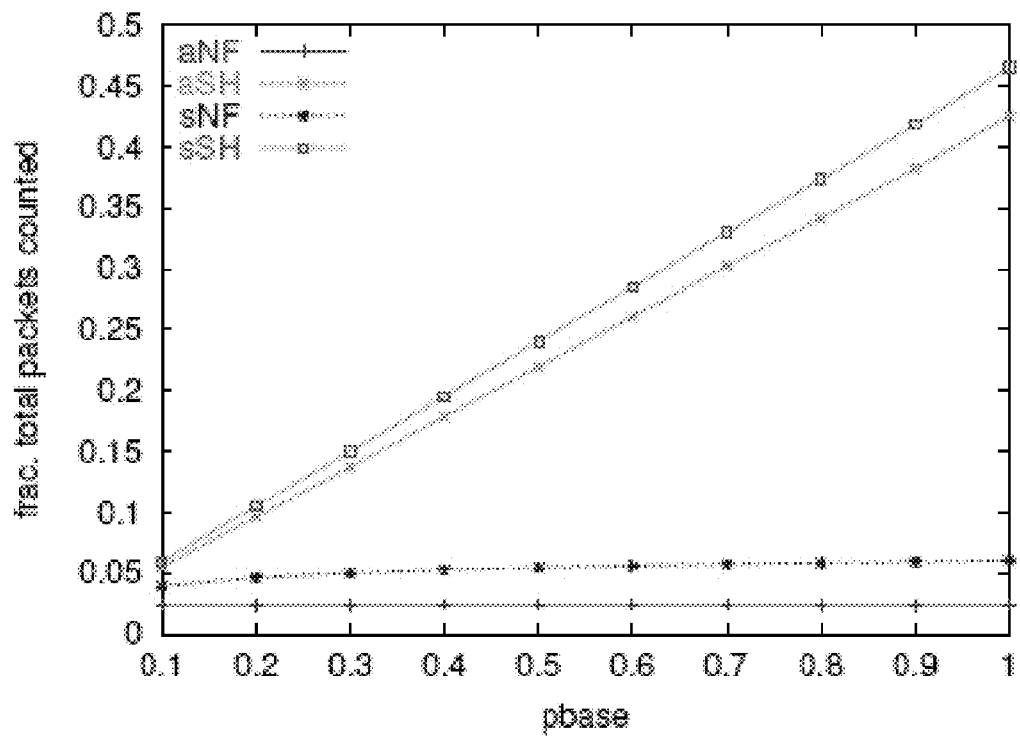
FIG. 6B shows sweeping $p_{base}$ to evaluate the tradeoffs in the hybrid algorithms. Fraction of packets in the $p_{base}$-sampled stream that are counted (left). Fraction of total packets that are counted (right). The figure shows subpopulations of top-64 flows for Pareto 1.4, k=400, $p_{start}=p_{base}$, $\mu=0.9$.

FIG. 6 shows the number of packets counted as a function of $p_{base}$ as a fraction of the number of packets in the $p_{base}$-sampled stream and as a fraction of the total number of packets. The hybrids provide a desirable smooth tradeoff that provides high counting rate of processed packets, while enabling to fully control the fraction of total packets that are processed.

8.4 Controlling the Number of Rate Adaptations

The parameter μ, which controls the rate of decrease of the sampling rate, is sweeped and through it, the total number of rate adaptations performed. It is expected that the (absolute value of the) relative error of the estimates to increase when μ is decreased, as fewer packets are counted and reflected in the final sketch. On the other hand, the number of rate adaptations performed and the size of intermediate temporary storage needed to store the count vectors for sNF and sSH should decrease with μ. The effectiveness of the parameter μ and the feasibility of a router implementation depends on this tradeoff.

Figure 7A:
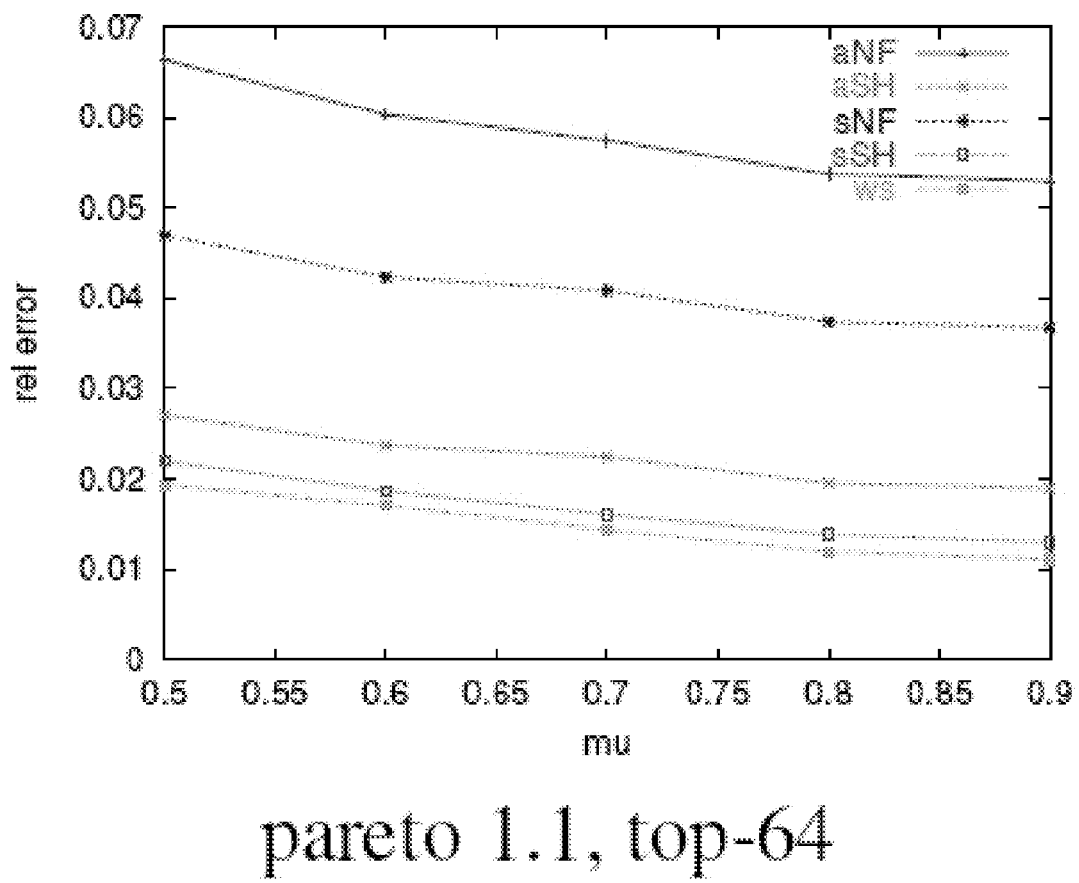
FIG. 7A shows sweeping $\mu$ to evaluate how it affects the (average absolute value of the) relative error. The figure shows subpopulations of top-64 flows for Pareto 1.1, $p_{start}=p_{base}=1$, k=400.
Figure 7B:
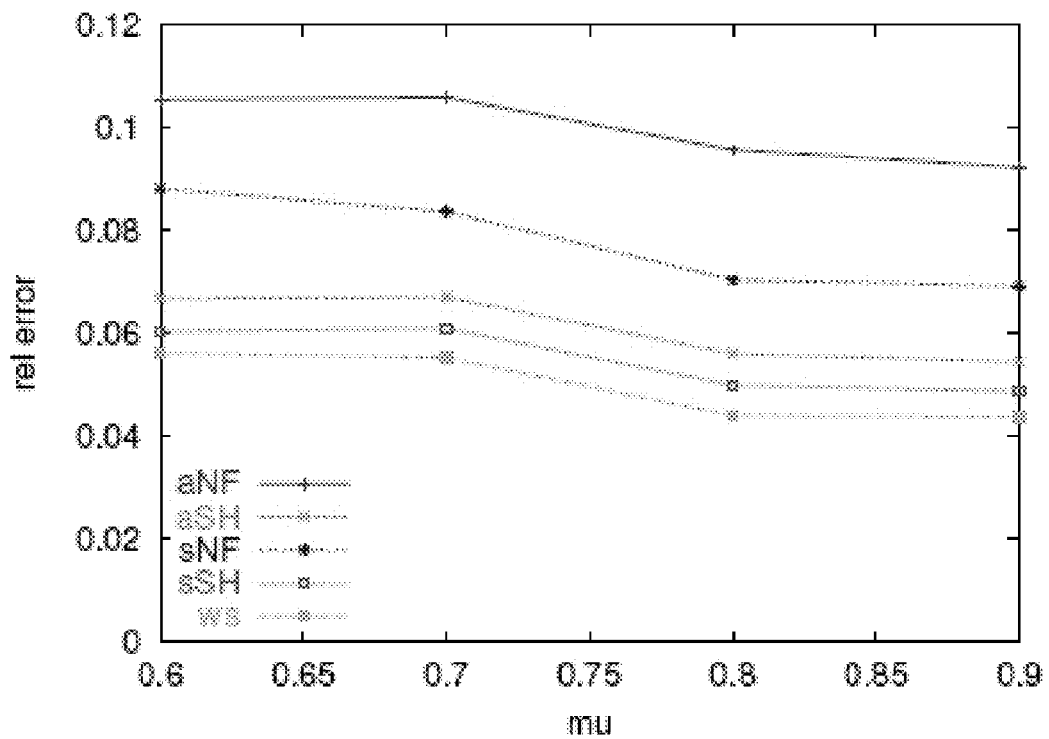
FIG. 7B shows sweeping $\mu$ to evaluate how it affects the (average absolute value of the) relative error. The figure shows subpopulations of top-64 flows for Pareto 1.4, $p_{start}=p_{base}=1$, k=400.

FIG. 7 shows the dependence of the average absolute value of the relative error on the parameter μ. It can be seen that there is minimal performance loss in terms of estimate quality when μ is reduced from 0.9 to 0.5.

Figure 8A:
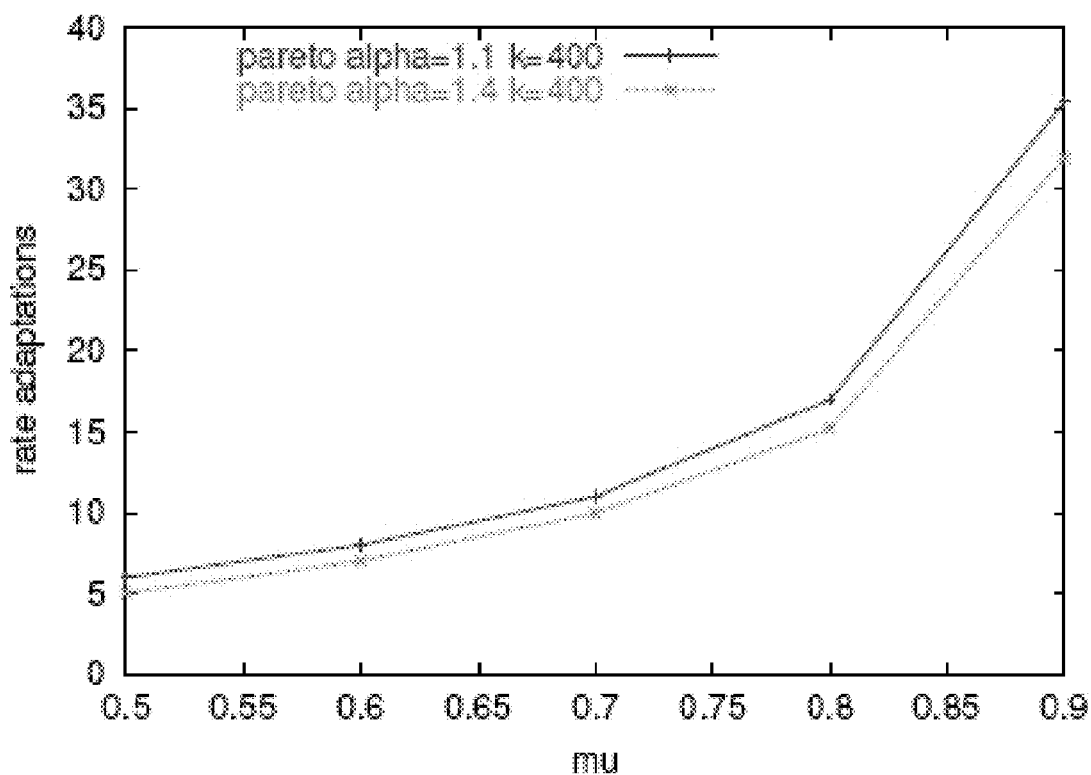
FIG. 8A shows sweeping $\mu$ to evaluate effectiveness decrease. Number of rate adaptations are compared for Pareto $\alpha=1.1$, k=400 and Pareto $\alpha=1.4$, k=400, $p_{start}=p_{base}=1$.
Figure 8B:
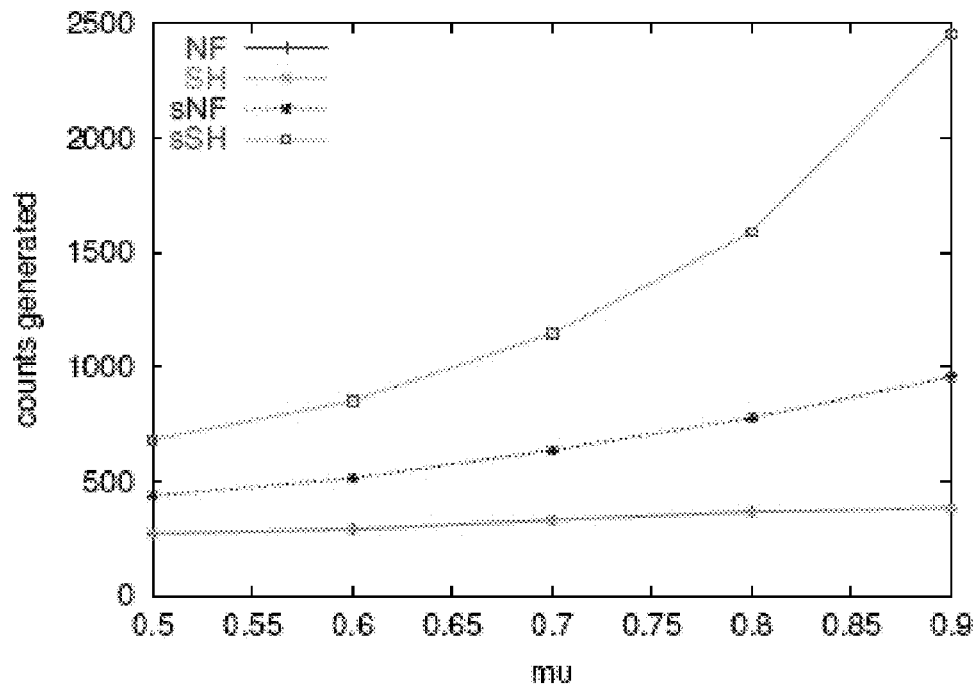
FIG. 8B shows sweeping p to evaluate effectiveness decrease. Number of counts for NF, SH, sNF and sSH, $p_{start}=p_{base}=1$, k=400.

FIG. 8 shows that selecting a smaller μ=0.5 is very effective. Firstly, the number of rate adaptations is much smaller, and secondly, the size of intermediate temporary storage needed for collecting the count vectors, is much smaller with, μ=0.5 than with μ=0.9.

9. Deferred Proofs

The adjusted weights assigned are a function of the observed count of the flow and the sampling rate. The sampling rate (effective sampling rate or sampling rate steps) in the adaptive algorithms is treated as fixed because for any flow f it is determined by the sampling performed on all "other" flows (F\{f}). Therefore, within the probability subspace where the sampling on all other flows is fixed, the sampling rate is fixed. The adjusted weight of each flow is unbiased within each such subspace.

Three different techniques to derive adjusted weights are deployed. These techniques are general tools applicable to other quantities such as adjusted counts, unbiased FSD estimators, and adjusted selectivities.

System of equations: The unbiasedness constraints correspond to linear equations over the variables $A_p^L(n)$. For a flow f, the expected adjusted weight over all possible observable counts n≤f of f must be equal to w(f): $w(f)=\Sigma_{n \leq f} q[n|f] A_p^L(n)$, where q[n|f] is the conditional probability that L obtains a count of n for a flow f. The system of equations can be used to derive expressions for the adjusted weights, be solved numerically to compute adjusted weights for each instance, or establish properties of the solution such as uniqueness. (A unique solution to this system implies that there is a unique deterministic assignment of adjusted weights that is a function of the observed counts of the flow and the sampling rate).

Dominance: Algorithm $A_1$ dominates $A_2$ if $A_1$ counts are "more informative," that is, each possible set of $A_1$ counts corresponds to a probability distribution over sets of $A_2$ counts such that applying $A_1$ and drawing an $A_2$ count from the corresponding distribution is equivalent to applying $A_2$. For example, sSH dominates ASH and ASH dominates ANF. Adjusted weights for $A_1$ can be derived from those of $A_2$ by taking the expectation of $A_2$ adjusted weights over the distribution that corresponds to the $A_1$ counts. If there is no closed form for $A_1$ adjusted weights, one can draw multiple times from the corresponding distribution and take an average of the $A_2$ adjusted weights. The resulting per-item adjusted weights of $A_1$ are unbiased and have equal or lower variance than $A_2$ adjusted weights (same arguments as for mimicked sketches [7]). Dominance implies that if an algorithm has unique deterministic adjusted weights, the per-item variance of these adjusted weights is at most that of any algorithm that it dominates.

Per-packet Horvitz-Thompson (HT) analysis. The HT estimator is applicable when both the weight and the sampling probability of each item are provided. The weight is available for packets, but in the unaggregated setting, not for flows, and therefore an adjusted weight is computed for each packet. The adjusted weight of the flow is then the sum of the adjusted weights of packets of the flow. The second ingredient needed for HT estimators is the sampling probability, which can not be determined from the sketch. HT is applied with sample space partitioning [5] to "bypass" knowledge of the sampling probability. Per-packet analysis allows to derive unbiased estimators for other packet-level properties.

9.1 Adjusted Weights for sSH

All three methods are demonstrated by applying them to derive sSH adjusted weights (proof of Theorem 4.8).

System of equations: Any valid observed count i of a flow with n packets has the form $(0, 0, i_j, n_{j+1}, \ldots, n_r)$, where $1 \leq i_j < n_j$. Vectors of this form are referred to as suffixes of the vector $n=(n_1, \ldots n_r)$. The notation $SUFF_n(j, i_j)$ is used for the suffix $(0, \ldots, 0, i_j, n_{j+1}, \ldots, n_r)$ of n (subscript is omitted when clear from context). The total order is utilized over the suffixes $SUFF_n(i, i_j)$ defined by the lexicographic order on the vectors $SUFF_n(i, i_j)$ with their coordinates reversed. That is, SUFF(r, 1)=(0, ..., 0, 1)<SUFF(r, 2)=(0, ...,
0, 2)< ... <SUFF(r; $n_r$)=(0, ..., 0, $n_r$)<SUFF(r−
1, 1)=(0, ..., 0, 1, $n_r$)< ... <SUFF(1,$n_1$)=
($n_1$, ..., $n_r$)

A correct adjusted weight assignment must satisfy for any vector n=($n_1, \ldots, n_r$), $$\sum_{s \leq n} q[s|n] A^{sSH}(s) = \sum_{j=1}^{r} n_j. \quad \text{(Eq. 7)}$$

(For a flow with counts $(n_1, \ldots, n_r)$, the expectation of the adjusted weight should be equal to the size $\Sigma_{j-1}^{r} n_j$ of the flow.)

To compute $A^{sSH}(n)$, a system of equations is obtained using an instance of Eq. (7) for each suffix $x \leq n$ of the observed count. The system of equations includes the variables $A^{sSH}(x)$ for all $x \leq n$ and the coefficients $q[s|x]$ for all $s \leq x$. The matrix is triangular and can be solved by substitutions. Computation of adjusted weights that directly utilizes the system of equalities requires a number of operations is the product of the number of nonzero coordinates of n and $(\Sigma_{h=1}^{r} n_i)^2$ (the square of the number of observed packets). (The time to solve the equations is proportional to $(\Sigma_{h-1}^{r} n_i)^2$, but having $(\Sigma_{h-1}^{r} n_i)^2$ coefficients, it takes time proportional to the number of nonzero coordinates of n to compute each one.) This quadratic dependence in the number of packets makes the computation very intensive for large flows. The equations are parametrically solved to derive expressions for the adjusted weights.

Lemma 9.1. Let $SUFF_n(j, i_j) \leq SUFF_n(k, i_k) \leq n$. The following equality holds:

$$q[SUFF_n(j, i_j)|n] = (1-p_j)^{(n_j - i_j) + \Sigma_{h=j+1}^{k-1} n_h} q[SUFF_n(j, i_j)|SUFF_n(k, i_k)].$$

Proof.

$$q[n|n] A^{sSH}(n) = \sum_{h=1}^{r} n_h - \sum_{s<n} q[s|n] A^{sSH}(s). \quad \text{From Eq. (7)}$$

Lemma 9.1 is applied to express the sum $\Sigma_{s<n} q[s|n] A^{sSH}(s)$ as a sum of sums of the form of the lhs of Eq. (7) for the vectors $SUFF_n(1, n_1-1)$ and $SUFF_n(k, n_k)$ (for $k=2, \ldots r$). Then the respective rhs is substituted.

$$\sum_{s<n} q[s|n] A^{sSH}(s) = (1-p_1) \sum_{\substack{s \leq SUFF(1,n_1-1) \\ SUFF(2,n_2) \prec s}} q[s|SUFF(1, n_1-1)] A^{sSH}(s) +$$

$$(1-p_2) \sum_{\substack{s \leq SUFF(2,n_2) \\ SUFF(3,n_3) \prec s}} q[s|SUFF(1, n_1-1)] A^{sSH}(s) + \ldots$$

$$(1-p_i) \sum_{\substack{s \leq SUFF(i,n_i) \\ SUFF(i+1,n_{i+1}) \prec s}} q[s|SUFF(1, n_1-1)] A^{sSH}(s) + \ldots +$$

$$(1-p_r) \sum_{s \leq SUFF(r,n_r)} q[s|SUFF(1, n_1-1)] A^{sSH}(s) ==$$

$$c_{1,1} \sum_{s \leq SUFF(1,n_1-1)} q[s|SUFF(1, n_1-1)] A^{sSH}(s) +$$

$$\sum_{h=2}^{r-1} (c_{1,h} - c_{1,1}) \sum_{\substack{s \leq SUFF(h,n_h) \\ SUFF(h+1,n_{h+1}) \prec s}} q[s|SUFF(1, n_1-1)] A^{sSH}(s) +$$

$$(c_{1,r} - c_{1,1}) \sum_{s \leq SUFF(r,n_r)} q[s|SUFF(1, n_1-1)] A^{sSH}(s) =$$

-continued $$c_{1,1} \left( \sum_{h=1}^{r} n_h - 1 \right) + \sum_{h=2}^{r-1} (c_{1,h} - c_{1,1})(1-p_h)^{n_1-1}$$

$$\sum_{\substack{s \leq SUFF(h,n_h) \\ SUFF(h+1,n_{h+1}) \prec s}} q[s|SUFF(2, n_2)] A^{sSH}(s) +$$

$$(c_{1,r} - c_{1,1})(1-p_r)^{n_1-1} \sum_{s \leq SUFF(r,n_r)} q[s|SUFF(2, n_2)] A^{sSH}(s) =$$

$$c_{1,1} \left( \sum_{h=1}^{r} n_h - 1 \right) +$$

$$\sum_{h=2}^{r-1} c_{2,h} \sum_{\substack{SUFF(h+1,n_{h+1}) \prec s \leq SUFF(h,n_h)}} q[s|SUFF(2, n_2)] A^{sSH}(s) +$$

$$c_{2,r} \sum_{s \leq SUFF(r,n_r)} q[s|SUFF(2, n_2)] A^{sSH}(s) = c_{1,1} \left( \sum_{h=1}^{r} n_h - 1 \right) +$$

$$c_{2,2} \sum_{s \leq SUFF(h,n_h)} q[s|SUFF(2, n_2)] A^{sSH}(s) + \sum_{h=3}^{r-1} (c_{2,h} - c_{2,2})$$

$$\sum_{\substack{SUFF(h+1,n_{h+1}) \prec s \leq SUFF(h,n_h)}} q[s|SUFF(2, n_2)] A^{sSH}(s) +$$

$$(c_{2,r} - c_{2,2}) \sum_{s \leq SUFF(r,n_r)} q[s|SUFF(2, n_2)] A^{sSH}(s) =$$

$$c_{1,1} \left( \sum_{h=1}^{r} n_h - 1 \right) + c_{2,2} \sum_{h=2}^{r} n_h + \sum_{h=3}^{r-1} (c_{2,h} - c_{2,2})$$

$$(1-p_h)^{n_2} \sum_{\substack{s \leq SUFF(h,n_h) \\ SUFF(h+1,n_{h+1}) \prec s}} q[s|SUFF(3, n_3)] A^{sSH}(s) +$$

$$(c_{2,r} - c_{2,2})(1-p_r)^{n_2} \sum_{s \leq SUFF(r,n_r)} q[s|SUFF(3, n_3)]$$

$$A^{sSH}(s) = c_{1,1} \left( \sum_{h=1}^{r} n_h - 1 \right) + c_{2,2} \sum_{h=2}^{r} n_h +$$

$$\sum_{h=3}^{r-1} c_{3,h} \sum_{\substack{SUFF(h+1,n_{h+1}) \prec s \leq SUFF(h,n_h)}} q[s|SUFF(3, n_3)]$$

$$A^{sSH}(s) + c_{3,r} \sum_{s \leq SUFF(r,n_r)} q[s|SUFF(3, n_3)]$$

$$A^{sSH}(s) =$$

$$\ldots = c_{1,1} \left( \sum_{h=1}^{r} n_h - 1 \right) + \sum_{j=2}^{r} \left( c_{j,j} \sum_{h=j}^{r} n_h \right).$$

Therefore, $$q[n|n] A^{sSH}(n) = \sum_{h=1}^{r} n_h - c_{1,1} \left( -1 + \sum_{h=1}^{r} n_h \right) - \sum_{j=2}^{r} c_{j,j} \sum_{h=j}^{r} n_h.$$

By rearranging it is obtained that $$q[n|n] A^{sSH}(n) = c_{1,1} + \sum_{i=1}^{r} n_i \left( 1 - \sum_{h=1}^{i} c_{h,h} \right).$$

The proof follows using Eq. (3).

Derivation based on per-packet HT estimator. Let h be a per-packet weight function and let $h(f)=\Sigma_{c \in f} h(c)$ be the $h(\ )$-value of f. ($h(c) \equiv w(c)=1$ for packet counts but other packet-level properties can also be used such as the number of bytes in c.) Unbiased adjusted $h(\ )$ values $H^{sSH}(c)$ are computed for each packet from which unbiased adjusted $h(\ )$ values can be obtained for each flow using $H^{sSH}(f)=\Sigma_{c \in f} H^{sSH}(c)$. By definition, packets that are not counted have adjusted $h(\ )$-values zero.

The HT estimator of $h(c)$ is the ratio of $h(c)$ and the probability that the packet c is counted in the sketch. It is clearly unbiased. This probability, however, can not be computed from the sketch. A partition of the sample space is used such that within each subspace in the partition there is a positive probability that the packet is sampled and this conditional probability can be determined from the sketch. The adjusted $h(\ )$ value for each packet is an application of the HT estimator within this subspace.

The adjusted $h(\ )$ value $H^{sSH}(c)$ of a counted packet c of a flow f is considered. The sample space is partitioned such that all rank assignments in the same subspace of the partition share the following.

1. The rank values of packets in $F\setminus\{f\}$.

2. The number of packets of f that are counted continuously up to and not including c. (Note that this could be 0.)

Note that the subspace that the rank assignment is mapped to also includes rank assignments where f does not appear in the sketch at all or that f appears but c is not counted. This happens if the current sampling rate drops below the current rank of the flow right before or after c is processed.

The conditional probability is computed that c is counted assuming that the rank assignment belongs to the particular subspace that it maps to. Since the ranks of packets of flows in $F\setminus\{f\}$ are fixed in this subspace then so are the steps, p, of the kth smallest rank of a flow in $F\setminus\{f\}$. Furthermore, in any rank assignment in the given partition where packet c is counted, the same number of packets in each step are counted. Let n be the vectors of counts obtained for f in any rank assignment where c is counted. (In rank assignments in the same subspace where c is not counted this vector could be different.)

$H^{sSH}(c)$ is computed according to one of the following cases.

1. Packet c is one of the $n_i$ packets counted in step i for some i>1. In this case the conditional probability that c is counted is $$\frac{q[n|n]}{1 - \sum_{h=1}^{i} c_{h,h}}. \quad (Eq.\ 8)$$

To see this, fix the ranks of packets of $F\setminus\{f\}$. Then $(1 - \Sigma_{h=1}^{i} c_{h,h})$ is the probability that all $n_1 + \ldots + n_i$ up to and including the packets of step i are counted. $q[n|n]$ is the probability that all n packets are counted. Therefore, Eq. (8) is the conditional probability that n is counted given that all packets up to c are counted.

It follows that $$H^{sSH}(c) = h(c) \frac{1 - \sum_{h=1}^{i} c_{h,h}}{q[n|n]}.$$

2. Suppose c is the first packet among the $n_1$ packets of step 1. In this case, the conditional probability that c is counted is $q[n|n]$, and $H^{sSH}(c)=h(c)/q[n|n]$.

3. Suppose that c is a packet of step 1 other than the first. Fixing the ranks of packets of flows in $F\setminus\{f\}$ the packets of step 1 with probability $p_1$ are counted: That is the probability that the first packet in step 1 is counted. So the conditional probability that c is counted is $q[n|n]/p_1$ and $H^{sSH}(c)=h(c)p_1/q[n|n]$.

Let $N_i$ be the set of packets counted in step i, and let $c_0$ be the first counted packet.

$$\begin{aligned}
H^{sSH}(f) &= \sum_{c \in f} H^{sSH}(f) \\
&= \sum_{j \geq 1} \sum_{c \in N_j} H^{sSH}(c) \\
&= \frac{h(c_0) + (h(N_1) - h(c_0))(1 - c_{1,1}) + \sum_{i=2}^{r} h(N_i)\left(1 - \sum_{h=1}^{i} c_{h,h}\right)}{q[n|n]} \\
&= \frac{h(c_0)c_{1,1} + \sum_{i=1}^{r} h(N_i)\left(1 - \sum_{h=1}^{i} c_{h,h}\right)}{q[n|n]}.
\end{aligned} \quad (Eq.\ 9)$$

To facilitate this estimator, the algorithm needs to collect per-step sums $h(N_i)$ over counted packets in the step and to separately record $h(c_0)$.

Derivation Based on Dominance of sSH Over aSH

Proof. Computed is the expectation of the adjusted weight of aSH when considered nonzero only on rank assignments such that sSH fully counts the flow. This expectation is referred to as the combined expectation. The conditional expectation sought is then the ratio of the combined expectation and $q^{sSH}[n|n]$. Therefore, it is needed to be shown that the combined expectation is equal to $q^{sSH}[n|n]A^{sSH}(n)$.

Suppose now that $|n|>n_r$. If the sSH count is n, the aSH count on the same rank assignment must start in a packet that occurred before the last step (for sSH to fully count the flow the rank must be at most $p_r$, before the beginning of the step), and therefore step r has contribution zero to the combined expectation. For each step r−1≧l>1, the "contribution" to the combined expectation if ASH started counting the flow during step l is computed. The probability that at the beginning of the step the rank value was at least $p_r$ is $(c_{l,r}-c_{l,l})$. Conditioned on that, the contribution to the expectation is $$\sum_{t=0}^{n_l-1}(1-p_r)^t p_r\left(\sum_{h=l}^{r}n_h+\frac{(1-p_r)}{p_r-t}\right)=\sum_{h=l}^{r}n_h-(1-p_r)^{n_l}\sum_{h=l+1}^{r}n_h. \quad \text{(Eq. 10)}$$

Therefore, the contribution is the product $$(c_{l,r}-c_{l,l})\left(\begin{array}{c}\sum_{h=l}^{r}n_h-\\(1-p_r)^{n_l}\sum_{h=l+1}^{r}n_h\end{array}\right)=(c_{l,r}-c_{l,l})\sum_{h=l}^{r}n_h-c_{l+1,r}\sum_{h=l+1}^{r}n_h. \quad \text{(Eq. 11)}$$

First considered is the case where $|n|=n_r$ (all observed packets are in the last step). In this case, if the sSH count is n, the ASH count must be $|n|$ and $\text{AsSH}(n)\equiv A^{ASH}(|n|)$. The combined expectation is therefore $q^{sSH}[n|n]A^{ASH}(|n|)=q^{sSH}[n|n]A^{sSH}(n)$.

One needs to be slightly careful with the first step by considering the rank of the first packet and then the other $n_1-1$ packets. With probability $p_r$, the first packet obtains rank value at most Pr and ASH uses the adjusted weight $\Sigma_{h=1}^{r}n_h+(1-p_r)/p_r$ and therefore the contribution is the product $$(1-p_r)+p_r\sum_{h=1}^{r}n_h. \quad \text{(Eq. 12)}$$

With probability $p_1-\Pr\equiv c_{1,r}-c_{1,1}$, the first packet obtains rank value in $(p_r, p_1)$, and applying a similar derivation as Eq. 10 for the remaining $n_1-1$ packets, it is obtained $-1+\Sigma_{h=1}^{r}n_h-(1-p_r)^{n_1-1}\Sigma_{h=2}^{r}n_h$.

The contribution is therefore, $$p_r-p_1+(c_{1,r}-c_{1,1})\sum_{h=1}^{r}n_h-c_{2,r}\sum_{h=2}^{r}n_h. \quad \text{(Eq. 13)}$$

Summing the contributions of all the steps in Eq. 11, Eq. 12, and Eq. 13, it is obtained that this expectation is (Using Theorem 4.8 and Eq. 3.)

$$(1-p_r)+p_r\sum_{h=1}^{r}n_h+p_r-p_1+$$

$$(c_{1,r}-c_{1,1})\sum_{h=1}^{r}n_h-c_{2,r}\sum_{h=2}^{r}n_h+\sum_{l=2}^{r-1}\left(\begin{array}{c}(c_{l,r}-c_{l,l})\sum_{h=l}^{r}n_h-\\c_{l+1,r}\sum_{h=l+1}^{r}n_h\end{array}\right)=$$

-continued $$p_1 n_1+(1-p_1)+\sum_{l=2}^{r}\left(1-\sum_{h=1}^{l}c_{h,h}\right)n_l=q^{sSH}[n|n]A^{sSH}(n).$$

Lemma 9.2. Consider a flow with sSH counts n. The conditional expectation of the adjusted weight assigned to the flow by $\text{ASH}$, given that the flow is fully counted by sSH, is equal to $A^{sSH}(n)$ (the adjusted weight assigned by sSH for observed count n).

9.2 Variance Relation

Consider a flow f with |f| packets and the probability subspace where ranks of packets belonging to all other flows (F\{f}) are fixed. It is sufficient to establish the relation between the methods in this subspace. Consider such a subspace. Let p be the steps of the effective sampling rate and $p_r$ be the final effective sampling rate. The adjusted weight assignment for all methods has expectation |f| within each such subspace. The variance of the different methods within such subspace is considered and the notation $\text{VAR}(A^L(f)|P)$ is used for $L\in\{sSH,sNF\}$, and $\text{VAR}(A^L(f)|p_r)$ for $L\in\{ws,ANF,ASH\}$. This conditioning is equivalent to establishing the variance relation when the sampling rate $p_r$ is fixed or when the steps p are fixed (and the last step is $p_r$). It is the key for extending the proofs to the discretized version, since it is simply conditioned on a different step function p determined by the discretized (k+1)th largest rank. It also shows that the variance relation holds for the fixed-rate and fixed-steps variants of ws NF and SH.

The variance for ANF is that of a binomial random variable and therefore is $$\text{VAR}(A^{ANF}(f)|p_r)=|f|(1-p_r)/p_r. \quad \text{(Eq. 14)}$$

For ws, the adjusted weight is $|f|/(1-(1-p_r)^{|f|})$ with probability $1-(1-p_r)^{|f|}$ and zero otherwise, and therefore, the variance is $$\text{VAR}(A^{WS}(f)|p_r)=|f|^2(1/(1-(1-p_r)-1). \quad \text{(Eq. 15)}$$

For ASH, it is $$\text{VAR}(A^{ASH}(f)|p_r)=\sum_{i=0}^{|f|-1}(1-p_r)^i p_r(|f|-i+(1-p_r)/p_r)^2-|f|^2 \quad \text{(Eq. 16)}$$

$$=((1-p_r)-(1-p_r)^{|f|+1})/p_r^2.$$

For sSH and for sNF, the variance $\text{VAR}(A^{sNF}(f)|p)$ depends on the way the packets of the flow f are distributed across these steps. The variance is lowest when all packets occur when the sampling probability is highest, and the variance is highest, and equal to that of ANF, when all packets occur on the step with the lowest sampling probability. The variance relation is established using the following Lemma.

Using the explicit expressions (Eq. 14, 15, 16) and the inequality $(1-p)^n\geq 1-np$ for all natural n and $0\leq p\leq 1$ it follows that $$\text{VAR}(A^{WS}(f)|p_r)\leq\text{VAR}(A^{ASH}(f)|p_r)\leq\text{VAR}(A^{ANF}(f)|p_r)$$

The relation between the variance of the different methods is established via direct arguments that provide more insights and are applicable to the step-counting algorithms.

Lemma 9.3. Consider two mappings $A_1$ and $A_2$ and suppose there exists a partition of the sample space S into subspaces such that within each subspace $S'\subset S$, $\mu_{S'}(A_1)=\mu_{S'}(A_2)$ (that is, $A_1$ and $A_2$ have the same expectation on the subspace S'), and $\mu_{S'}^2(A_1) \geq \mu_{S'}^2(A_2)$ (the variance, or alternatively, the second raw moment, of $A_1$ is at least as large as $A_2$).

Then $\mu_S(A_1)=\mu_S(A_2)$ and $\mu_S^2(A_1) \geq \mu_S^2(A_2)$ ($A_1$ and $A_2$ have the same expectation and the variance of $A_1$ is at least as large as $A_2$.)

Corollary 9.4. Let $A_1$ be an estimator and consider a partition of the sample space. Consider the estimator $A'_1$, that has a value that is equal to the expectation of $A_1$ on the respective part of the partition. Then $$E(A_1)=E(A'_1) \text{ and } \text{VAR}(A_1) \geq \text{VAR}(A'_1).$$

If f is not included in the sample ($r(f)>p_r$), it obtains an adjusted weight of zero with all four methods. Therefore, it suffices to compare the methods based on the variance in the adjusted weight assignment within the probability subspace when the flow is sampled ($r(f) \leq p_r$). Since all methods are unbiased, they all have the same expectation on this subspace. Apply Lemma 9.3. With ws, f obtains an adjusted weight of $\sqrt[3]{f}/(1-(1-p_r)^{|f|})$, which is fixed, therefore the variance is zero. Therefore, this assignment is optimal among all methods that yield the same probability distributions over subsets of flows. In particular, $$\text{VAR}(A^{WS}(f)|p_r) \leq \text{VAR}(A^{sSH}(f)|p).$$

Next ANF and ASH are compared. The probability subspace is further partitioned by fixing the position $i \in [1, \ldots, |f|]$ of the first packet in f that obtains rank that is at most $p_r$. The adjusted weight assigned by ASH is (a fixed value) of $(1/p_r)+(|f|-i)$, and therefore the variance is zero. ANF assignment is $(1/p_r)$ plus $(1/p_r)$ times a binomial random variable with parameters $(|f|-i)$ and $p_r$. This assignment has the same conditional expectation as the ASH assignment within this subspace, but also has a nonnegative, and therefore at least as large, variance (the variance is strictly positive when $i<|f|$). Therefore, using Lemma 9.3, ASH has a smaller variance overall than ANF.

The variance of sSH and ASH is compared by again applying Lemma 9.3. (Since sSH does not have the same expectation as ASH on each such subspace, the same partition that was used for comparing ASH and ANF cannot be used here.) The sample space is partitioned according to the suffix of the packets of f that are counted using sSH. That is, each subspace contains all rank assignments to packets of f that result in this suffix being counted. The adjusted weight assigned by sSH is fixed within each partition and therefore has zero variance. The ASH adjusted weight depends on the first packet that obtains rank value below $p_r$, and therefore varies. (The variance can be zero only if all suffix packets are contained in the last step. In this case, the first packet of the suffix has rank value below $p_r$ and therefore all suffix packets are counted by ASH.) What remains to show is that ASH and sSH adjusted weights have the same expectation within each such subspace.

The following simple observation is applied. Consider a flow with counts n and a vector $s \leq n$. The conditional probability that i packets are counted using ASH given that s is counted using sSH is independent of the choice of n (depends only on s). Therefore, the expectation of the adjusted weight assigned by ASH conditioned on sSH counting s out of n is equal to the expectation when sSH counts s out of s. This simplifies the proof, as it suffices to establish equality for flows that are fully counted by sSH, which is established in Lemma 9.2.

Lemma 9.5. $\text{VAR}(A^{sSH}(f)|p) \leq \text{VAR}(A^{sNF}(f)|p)$

Proof. Consider a flow f and a probability space $\Omega^{(p)}$ containing all rank assignments such that the steps (as defined by the kth smallest rank in F\J) are p. Consider a partition of $\Omega$ to subspaces $\Omega_n^{(p)}$ according to the sSH count vector n obtained for f.

Consider one such subspace $\Omega_n^{(p)}$. By definition, the adjusted weight assigned to the flow f in this subspace is fixed and is equal to $A_p^{sSH}(n)$.

Another sSH adjusted weight assignment is defined, $A'^{sSH}_p(n)$ as the expectation of the estimator $A_p^{sNF}$ over rank assignments in $\Omega_n^{(p)}$.

For any rank assignment, a packet is counted by sNF only if it is counted by sSH. The first counted packet by sSH, must also be counted by sNF. Therefore, s is a possible sNF count off in $\Omega_n^{(p)}$ if and only if it has the form $s \leq n$ (component wise) and $s_1>0$ (assume WLOG that $n_1>0$). For notation convenience, the vectors $n'=(1, n_1-1, n_2, \ldots n_r)$, $s'=(1, s_1-1, s_2, \ldots s_r)$ and $p'=(p_1, p_1, p_2, \ldots p_r)$ are defined. (That is, a "dummy" step with probability $p_1$ is created, that precedes the first step and contains the first packet of n.) This notation allows to specify that the first "packet" of n is counted.

The probability over $\Omega_n^{(p)}$ of a rank assignment with corresponding sNF count s is equal to $$q_{p'}^{sNF}[s'|n']/q_p^{sSH}[n|n].$$

Therefore, $$A'^{sSH}_p(n) = \sum_{s \leq n|s_1>0} \frac{q_{p'}^{sNF}[s'|n']}{q^{sSH}p[n|n]} A_p^{sNF}(s). \quad \text{(Eq. 17)}$$

It follows from Equation (17) that $A'^{sSH}_p(n)$ is a deterministic function of p and n. (This also follows the fact that sSH dominates sNF in the sense that sNF sketches can be emulated from sSH sketches. That is, given p and n, an sNF sketch can be drawn from $\Omega_n^{(p)}$). Using corollary 9.4, the estimator $A'^{sSH}_p$ is unbiased and has variance that is at most that of $A_p^{sNF}$ over $\Omega_p$ (and therefore, over any probability space that consists of subspaces of the form of $\Omega_p$.)

In Sections 4.1 and 9.1 it is shown that $A_p^{sSH}(n)$ is the unique solution of a system of equations. Therefore, it is the only possible assignment of adjusted weights that are a deterministic function of p and n and are unbiased (has expectation $|f|$) for any possible f and a corresponding probability space $\Omega^{(p)}$. Since the estimator $A'^{sSH}_p(n)$ is also a deterministic function of n and p and is unbiased on $\Omega^{(p)}$ it follows that $$A_p^{sSH} \equiv A'^{sSH}_p.$$

9.3 Adjusted Weights for sNF

Theorem 4.10 is proven (derivation of adjusted weights for sNF) using the dominance of sNF over ANF. This proof also establishes the variance relation $\text{VAR}(A^{sNF}(f|p)) \leq \text{VAR}(A^{NF}(f|p_r))$ Proof. The ranks of the packets of flows in F\f are fixed. The steps p of the kth smallest rank of a flow in F\f are then fixed. Let n be the number of packets off in each of these steps. (It is assumed without loss of generality that $n_1>0$.)

The subspace V of rank assignments where f is fully counted is considered. Let $A^{sNF}(n)$ be the adjusted weight that f obtains at any point of this subspace. It is shown that $A^{sNF}(n)$ is the average of the adjusted weight of NF in V. Note that the fraction of V is $q^{sNF}[n|n]$.

Consider first points in V where the first packet that has rank at most $p_r$ is a packet t of step 1.

The probability that sNF counted all packets and packet t+1 was the first packet to obtain rank value at most $p_r$ is $(p_1-p_r)^t p_r p_1^{n_1-t-1} \Pi_{h=2}^r p_h^{n_h}$. Conditioned on this, the adjusted weight assigned by NF is the number of counted packets divided by $p_r$. The expected number of counted packets from step 1 is $1+(n_1-t-1)(p_r/p_1)$ and the expected number from step $2 \leq j \leq r$ is $n_j(p_r/p_j)$. Therefore, the expected adjusted weight assigned by NF is $(1/p_r + \Sigma_{j=1}^r n_j/p_j - (t+1)/p_1)$. A sum is taken over $t=0, \ldots, n_1-1$ and divided by $q^{sNF}[n|n]$ to obtain the contribution to the average adjusted weight of NF in V of the points where the first packet that has rank at most $p_r$ is of step 1.

$$\frac{\prod_{h=2}^{r} p_h^{n_h} \sum_{t=0}^{n_1-1} (p_1 - p_r)^t p_r p_1^{n_1-t-1} \left( \frac{1}{p_r} + \sum_{j=1}^{r} \frac{n_j}{p_j} - \frac{(t+1)}{p_1} \right)}{q^{sNF}[n|n]}. \quad \text{(Eq. 18)}$$

The derivation of the contribution to the average of points where the first packet having rank at most $p_r$ is in steps $l=2, \ldots r-1$ is similar to that of Eq. (18), observing that $$\frac{(d_{l,r} - d_{l,l})}{p_l^{n_l}}(p_l - p_r)^t p_r p_l^{n_l-t-1}$$

is the probability that sNF fully counted the flow and the first packet to obtain rank value at most Pr was packet t+1 during step l. (Observe that the contribution of the last step must be zero unless it is the only step, since if the flow is fully counted its rank must be at most $p_r$ before the beginning of the last step.) The denominator $q^{sNF}[n|n]$ is omitted from the following two Equations.

$$\frac{(d_{l,r} - d_{l,l})}{p_l^{n_l}} \sum_{t=0}^{n_l-1} (p_l - p_r)^t p_r p_l^{n_l-t-l} \left( \frac{1}{p_r} + \sum_{j=l}^{r} \frac{n_j}{p_j} - \frac{t+1}{p_l} \right). \quad \text{(Eq. 19)}$$

It is obtained that Eq. (19) (contribution of step $l>1$) is equal to $$(d_{l,r} - d_{l,l}) \frac{p_r}{p_l} \sum_{t=0}^{n_l-1} \left(\frac{p_l - p_r}{p_l}\right)^t \left( \frac{1}{p_r} + \sum_{j=l}^{r} \frac{n_j}{p_j} - \frac{t+1}{p_l} \right) = \quad \text{(Eq. 20)}$$

$$(d_{l,r} - d_{l,l}) \frac{p_r}{p_l} \left\{ \begin{array}{c} \left( \frac{p_l - p_r}{p_l p_r} + \sum_{j=l}^{r} \frac{n_j}{p_j} \right) \sum_{t=0}^{n_l-1} \left( \frac{p_l - p_r}{p_l} \right)^t \\ \frac{1}{p_l} \sum_{t=0}^{n_l-1} \left( \frac{p_l - p_r}{p_l} \right)^t t \end{array} \right\}$$

The first sum in the expression above is geometric, and the second is of the form $$\sum_{k=0}^{m} k q^k \text{ for } q = \frac{p_l - p_r}{p_l}.$$

Since, $$\sum_{k=0}^{m} k q^k = \sum_{k=0}^{m} (f(k+1) - f(k)) = f(m+1) - f(0)$$

where $$f(x) = \frac{1}{q-1}\left( xq^x - \frac{q^{x+1}}{q-1} \right),$$

it follows that $$\sum_{k=0}^{m} k q^k = \frac{1}{q-1}\left( (m+1)q^{m+1} - \frac{q^{m+2}}{q-1} + \frac{q}{q-1} \right).$$

Using these observations, it is obtained that Equation (20) is equal to $$= (d_{l,r} - d_{l,l}) \left\{ \begin{array}{c} \left( \frac{p_l - p_r}{p_l p_r} + \sum_{j=l}^{r} \frac{n_j}{p_j} \right)\left( 1 - \left( \frac{p_l - p_r}{p_l} \right)^{n_l} \right) + \\ \frac{n_l}{p_l}\left( \frac{p_l - p_r}{p_l} \right)^{n_l} + \frac{p_l - p_r}{p_l p_r}\left( \frac{p_l - p_r}{p_l} \right)^{n_l} - \frac{p_l - p_r}{p_l p_r} \end{array} \right\} = \quad \text{(Eq. 21)}$$

$$\left( \frac{p_l - p_r}{p_l p_r} + \sum_{j=l}^{r} \frac{n_j}{p_j} \right)(d_{l,r} - d_{l,l} - d_{l+1,r}) +$$

$$\frac{n_l}{p_l} d_{l+1,r} + \frac{p_l - p_r}{p_l p_r} d_{l+1,r} - \frac{p_l - p_r}{p_l p_r}(d_{l,r} - d_{l,l}) =$$

$$(d_{l,r} - d_{l,l}) \sum_{j=l}^{r} \frac{n_j}{p_j} - d_{l+1,r} \sum_{j=l+1}^{r} \frac{n_j}{p_j}$$

By applying similar manipulations to Eq. (18), it is obtained that the numerator of that equation is equal to $$\prod_{h=1}^{r} p_h^{n_h} \sum_{j=1}^{r} \frac{n_j}{p_j} - d_{2,r} \sum_{j=2}^{r} \frac{n_j}{p_j} \quad \text{(Eq. 22)}$$

Summing the contributions of steps $l=1, \ldots, r-1$ (Eq. (22) and Eq. (21) for $l=2, \ldots, r-1$) and obtain that the total contribution to the expectation is $$\prod_{h=1}^{r} p_h^{n_h} \sum_{j=1}^{r} \frac{n_j}{p_j} - \sum_{l=2}^{r} d_{l,l} \sum_{j=l}^{r} \frac{n_j}{p_j} = \sum_{j=1}^{r} \frac{n_j}{p_j}\left( \prod_{h=1}^{r} p_h^{n_h} - \sum_{l=2}^{j} d_{l,l} \right).$$

Therefore, $$A^{sNF}(n) = \frac{\sum_{j=1}^{r} \frac{n_j}{p_j}\left( \prod_{h=1}^{r} p_h^{n_h} - \sum_{l=2}^{j} d_{l,l} \right)}{q^{sNF}[n|n]}. \quad \text{(Eq. 23)}$$

The proof follows using Eq. (4).

Alternate proof (sketch) based on per-packet HT estimator. Applying the HT estimator, an adjusted h( )-value for each observed packet is obtained. The proof methodology is similar to the one provided for sSH, so only a sketch is provided.

Consider a rank assignment x that results in an sNF sketch with steps p. The sketch includes a flow f with counts n. Let $N_i \subset f(i=1, \ldots, r)$ be the set of packets of f that are counted with x at step i.

Each packet is associated with a subspace of rank assignments as follows. For $c \in N_i$, the subspace is defined by the following constraints: (i) The rank values of all packets of flows in $F\setminus\{f\}$ are as in x. (ii) Each packet $a \in \cup_{j=1}^{i} N_j \setminus \{c\}$ has rank value that is below the current sampling rate at the time the packet arrives. (iii) The rank assignment is such that at the time packet c arrives, flow f is cached with a count that includes all the packets in $\cup_{j=1}^{i} N_j$ that precede c.

This is a mapping from a rank assignment x and a packet c into a subspace. The subspaces partition the space of all rank assignments (including those where c is not counted in the sketch).

Next it is shown how to compute, given the sketch and the packet c, the conditional probability, within the subspace which x maps to, that c is counted. This probability is equal to the probability that all packets in $\cup_{j=1}^{i} N_j$ are counted. Consider the subspace defined by (i): The probability that (ii)+(iii) hold given (i) is: $(1/p_i)(\Pi_{h=1}^{r} p_h^{n_h} - \Sigma_{j=2}^{i} d_{j,j})$. The probability that all packets in $\cup_{j=1}^{i} N_j$ are counted given the constraint (i) is $$\prod_{h=1}^{r} p_h^{n_h} - \sum_{j=2}^{r} d_{j,j}.$$

If all $$E(A(f_1)A(f_2) \mid (r(f_1) < r_{k-1}) \wedge (r(f_2) < r_{k-1})) = \frac{w(f_1)w(f_2)}{PR\{r(f_1) < r_{k-1}\}PR\{r(f_2) < r_{k-1}\}}. \quad \text{(Eq. 25)}$$

Therefore, on this part $$E(A(f_1)A(f_2)) = \frac{PR\{r(f_1) < r_{k-1}\}PR\{r(f_2) < r_{k-1}\}w(f_1)w(f_2)}{PR\{r(f_1) < r_{k-1}\}PR\{r(f_2) < r_{k-1}\}} \quad \text{(Eq. 26)}$$
$$= w(f_1)w(f_2).$$

Next consider sSH. (The proof for sNF is along the same lines and is omitted.) The following property is used: fix the step function p of the current sampling rate and let $p_r$, be the effective sampling rate. The expectation of $A^{sSH}(f_1)$ conditioned on $r(f_1) < Pr$ is equal to $w(f)/PR\{r(1) < p_r\}$. The sample space is partitioned according to the step functions of $r_{k-1}$ and $r_k$ (the kth and (k-1)th smallest current rank value among the flows in $F\setminus\{f_1, f_2\}$). Consider a part in this partition. The product $A(f_1)A(f_2)$ is positive only if $r(f_1) < r_{k-1}$ and $r(f_2) < r_{k-1}$. In this case, the current sampling rate is $r_{k-1}$. Fix the ranks of $f_2$ packets. The current sampling rate is determined and it is a step function p with effective sampling rate $p_r = r_{k-1}$. The conditioned expectation of $A(f_1)$ in this part after fixing $f_2$ ranks, and given that it has $r(f_1) < r_{k-1}$ is $w(f_1)/PR\{r(f_1) < r_{k-1}\}$. It is independent of the $f_2$ ranks and therefore, the adjusted weight $A(f_1)$ and $A(f_2)$ in this part, conditioned on them both having ranks below $r_{k-1}$, are independent. Hence, the conditioned expectation of the product is as in Eq. 25 and therefore Eq. 26 also holds.

9.5 FSD Estimators

The proof of Lemma 5.2 is provided.

Proof. The proof is along the same lines of Lemma 9.2. The expectation of the ASH FSD estimator conditioned on the sSH observed counts and sampling rate steps is computed. Therefore, it is also established that the sSH-based estimator has at most the same variance as the ASH estimator. packets are counted in the subspace specified by (i), then constraints (ii) and (iii) must hold. Therefore, the probability that c is counted conditioned on (i)+(ii)+(iii) is $$\frac{\prod_{h=1}^{r} p_h^{n_h} - \sum_{j=2}^{r} d_{j,j}}{(1/p_i)\left(\prod_{h=1}^{r} p_h^{n_h} - \sum_{j=2}^{i} d_{j,j}\right)}.$$

The adjusted h( )-value of the packet c is then $$H^{sNF}(c) = \frac{(h(c)/p_i)\prod_{h=1}^{r} p_h^{n_h} - \sum_{j=2}^{i} d_{j,j}}{\prod_{h=1}^{r} p_h^{n_h} - \sum_{j=2}^{r} d_{j,j}}.$$

The adjusted h( )-value of the flow is $$H^{sNF}(f) = \sum_{c \in f} H^{sNF}(c) = \frac{\sum_{i=1}^{r} \frac{h(N_i)}{p_i} \prod_{h=1}^{r} p_h^{n_h} - \sum_{j=2}^{i} d_{j,j}}{\prod_{h=1}^{r} p_h^{n_h} - \sum_{j=2}^{r} d_{j,j}}. \quad \text{(Eq. 24)}$$

9.4 Covariances

The proof of Lemma 4.11 is based on conditioning on the rank values of packets belonging to flows in $F\setminus\{(f_1, f_2\}$, and the methodology carries over to establish this property for the discretized versions.

Proof. It suffices to show that $E(A(f_1)A(f_2)) = w(f_1)w(f_2)$ (the superscript L is omitted). The proof method in [4] used to establish zero covariance for rank conditioning estimators is adapted. The sample space is partitioned according to the (k-1)th smallest rank value among the flows in $F\setminus\{f_1, f_2\}$. Consider one part and let $r_{k-1}$ be that rank value. The product $A(f_1)A(f_2)$ is positive only when $r(f_1) < r_{k-1}$ and $r(f_2) < r_{k-1}$ (it is zero otherwise, since at least one of $f_1$ or $f_2$ is not included in the sketch). In this case, the effective sampling rate is equal to $r_{k-1}$. The count obtained for $f_1$ using ASH or ANF only depends on $r_{k-1}$ and not on the count of $f_2$. Therefore $A(f_1)$ and $A(f_2)$ are independent conditioned on them both having ranks below $r_{k-1}$. The expectation of $A(f_1)$ under this conditioning is $w(f_1)/PR\{r(f_i) < r_{k-1}\}$, and the conditional expectation Denote by $\pi(p, n, j)$ the conditional probability of an ASH count j given sSH count n and steps p. For all $i \geq 1$, $$\alpha_i^{sSH}(p, n) = \sum_{j=1}^{|n|} \pi(p, n, j)\alpha_i^{ASH}(p_r, j) \quad \text{(Eq. 27)}$$
$$= \frac{\pi(p, n, i)}{p_r} - \frac{\pi(p, n, i+1)(1-p_r)}{p_r}.$$

If $|n|=1$ then $\pi(p, n, 1)=1$ and $\pi(p, n, j)=0$ for $j \neq 1$ (the ASH count is 1 with probability 1). Therefore $\alpha_1^{sSH}(p, n)=1/p_r$ (and $\alpha_j^{sSH}(p, n)=0$ for all $j \neq 1$).

If $|n|=n_r$ then $\pi(p, n, n_r)=1$ and $\pi(p, n, j)=0$ for $j\neq n_r$ (the ASH count is $n_r$ with probability 1). Therefore, the only nonzero $\alpha_j^{sSH}(p, n)$ are $\alpha_{n_r}^{sSH}(p, n)=1/p_r$ and $\alpha_{n_r-1}^{sSH}(p, n)=-(1-p^r)/p_r$.

Consider n such that $|n|>1$ and $|n|>n_r$. Assume WLOG that $n_l>0$ for $1\leq l\leq r$. The probabilities $\pi(p, n, x)>0$ are positive if only if $|n|\geq x\geq n_r+1$ and are as follows:

$l = 2, \ldots, r - 1$ and $$\sum_{h=l+1}^{r} < x \leq \sum_{h=l}^{r} n_h: \quad \pi(p, n, x) = \frac{(c_{l,r} - c_{l,l})(1 - p_r)\sum_{h=l}^{r} n_h^{-x} p_r}{q^{sSH}[n \mid n]}.$$

$$\sum_{h=2}^{r} n_h < x < \sum_{h=1}^{r} n_h: \quad \pi(p, n, x) = \frac{(c_{1,r} - c_{1,1})(1 - p_r)\sum_{h=1}^{r} n_h^{-1-x} p_r}{q^{sSH}[n \mid n]}$$

$x = |n|$: $\pi(p, n, |n|) = p_r/q^{sSH}[n \mid n]$.

Therefore, $\alpha_i^{sSH}(p, n)$ can be nonzero only for $|n|\geq i\geq n_r$. These values are computed case by case using Eq. (27).

$i$ such that $\sum_{j=l+1}^{r} n_j < i < \sum_{j=l}^{r} n_j$ for some $2 \leq l \leq r - 1$:

$$\alpha_i^{sSH}(p, n) = \frac{(c_{l,r} - c_{l,l})(1 - p_r)\sum_{h=l}^{r} n_h^{-i} p_r}{q^{sSH}[n \mid n] p_r} -$$

$$\frac{(1 - p_r)(c_{l,r} - c_{l,l})(1 - p_r)\sum_{h=l}^{r} n_h^{-i-1} p_r}{q^{sSH}[n \mid n] p_r}$$

$= 0$ if $n_1 \geq 3$, $i$ such that $\sum_{j=2}^{r} n_j < i < \sum_{j=1}^{r} n_j - 1$:

$$\alpha_i^{sSH}(p, n) = \frac{(c_{1,r} - c_{1,1})(1 - p_r)\sum_{h=1}^{r} n_h^{-i-1} p_r}{q^{sSH}[n \mid n] p_r} -$$

$$\frac{(1 - p_r)(c_{1,r} - c_{1,1})(1 - p_r)\sum_{h=1}^{r} n_h^{-i-2} p_r}{q^{sSH}[n \mid n] p_r}$$

$= 0$ $i=\Sigma_{j=l}^{r} n_j$ for some $2\leq l\leq r$. If $l=2$ it is assumed $n_1>1$. If $l=r$ it is assumed $n_r>0$ (because otherwise $\alpha_{n_r}(\ )$ is not defined.):

$$\alpha_i^{sSH}(p, n) = \frac{(c_{l,r} - c_{l,l})p_r}{q^{sSH}[n \mid n] p_r} -$$

$$\frac{(1 - p_r)(c_{l-1,r} - c_{l-1,l-1})(1 - p_r)^{n_l-1} p_r}{q^{sSH}[n \mid n] p_r}$$

$$= \frac{-c_{l,l}}{q^{sSH}[n \mid n]}$$

-continued $i = \sum_{j=2}^{r} n_j, n_1 = 1$:

$$\alpha_i^{sSH}(p, n) = \frac{(c_{2,r} - c_{2,2})p_r}{q^{sSH}[n \mid n] p_r} - \frac{(1 - p_r)p_r}{q^{sSH}[n \mid n] p_r}$$

$$= \frac{-(1 - p_2)}{q^{sSH}[n \mid n]}$$

$$\equiv \frac{-c_{1,1} - c_{2,2}}{q^{sSH}[n \mid n]}$$

$i = -1 + \sum_{j=1}^{r} n_j, n_1 > 1$:

$$\alpha_i^{sSH}(p, n) = \frac{(c_{1,r} - c_{1,1})p_r}{q^{sSH}[n \mid n] p_r} - \frac{(1 - p_r)p_r}{q^{sSH}[n \mid n] p_r}$$

$$= \frac{-(1 - p_1)}{q^{sSH}[n \mid n]}$$

$$= \frac{-c_{1,1}}{q^{sSH}[n \mid n]}$$

$i = \sum_{j=1}^{r} n_j$:

$$\alpha_i^{sSH}(p, n) = \frac{p_r}{q^{sSH}[n \mid n] p_r} - 0$$

$$= \frac{1}{q^{sSH}[n \mid n]}$$

9.6 Estimators with Negative Covariances

ANF adjusted weights. A direct proof for the ANF adjusted selectivities is provided.

Lemma 9.6. Let n: F be the ANF counts. For all $$f \in F, R^{ANF}(f) = \frac{n(f)}{n(F)}$$

are unbiased selectivities, that is, $E(R^{ANF}(f))=w(f)/w(F)$.

Proof. Per-packet adjusted selectivities are assigned such that for each packet v, $R^{ANF}(v)=1/n(F)$ if v is counted and $R^{ANF}(v)=0$ otherwise.

$R^{ANF}(f)=\Sigma_{v\in f} R^{ANF}(v)$. It suffices to show that for each packet v, $E(R^{ANF}(v))=1/w(F)$.

The rank-based view of the sample space is used. Consider a rank assignment and the permutation of the packets according to their order by increasing rank value. Order the flows by the position of their first packet. Then $n(F)+1$ is the position of the first packet of the $(k+1)^{st}$ flow in this order. The first k flows are the ones included in the sketch.

Consider a packet $v \in f$ and a partition of rank assignments over $F\backslash\{v\}$ (all packets other than v) according to the induced permutation on these packets. For each permutation, a corresponding value of l is defined as follows. If the first k flows in the induced permutation on $F\backslash\{v\}$ include f then l is the position of the first packet of the (k+1) st flow. If the first k flows do not include f then l is the position of the first packet of the (k)th flow.

Consider a probability subspace in this partition and the respective value of l. The packet v is counted if and only if its position in the permutation is at most l. The conditional probability (in this subspace) that v is counted is $1/w(F)$. In this case there are 1 counted packets ($n(F)=l$) and the adjusted selectivity of v is $1/l$. So in this subspace $$E(R^{ANF}(v)) = \frac{l}{w(F)}\frac{1}{l} + \frac{w(F)-l}{w(F)}0 = 1/w(F).$$

The effective sampling rate distribution is determined by $w(F)$ and the observed counts n: $F=\{(f, n(f))\}$. Consider a partition of the sample space according to n: F, and denote by $\Omega^{(L,n:F)}$ the subspace that corresponds to n: F. It will be shown that the estimator $A^{+L}$ (f, n: F, w (F)) is the expectation of the estimator $A^L(n(f))$ over $\Omega^{(L,n:F)}$ for L∈NF, ASH. Therefore, the relation $VAR(A^{+L}(f)) \leq VAR(A^L(f))$ for all f∈F follows using Corollary 9.4.

Lemma 9.7. For any flow f∈F, $$\text{VAR}(A^{+A^{NF}}) \leq \text{VAR}(A^{A^{NF}}(f)).$$

Proof. Consider a subspace $\Omega^{(n:F)}$. In this subspace, $A^{+A^{NF}}(f))=w(F)n(f)/n(F)$ is fixed. It is shown that within $\Omega^{(n:f)}$, $$E(A^{A^{NF}}(f))=E(w(F)R^{A^{NF}}(f))=w(F)n(f)/n(F).$$

$A^{A^{NF}}(f)$ is equal to $n(f)$ divided by the effective sampling rate, which is the $n(F)+1$ smallest rank value. If the subspace contains a rank assignment, it contains all rank assignments that result in the same permutation (rank ordering) of packets. The effective sampling rate distribution in $\Omega^{(n:F)}$ is that of the $n(F)+1$ smallest among $w(F)$ independent random variables from $U[0,1]$. The expectation of the inverse of the ith smallest among n independent draws from $U[0,1]$ is known to be $n/(i-1)$. Therefore, the expectation of the inverse of the effective sampling rate in $\Omega^{(n:F)}$ is $w(F)/n(F)$ and $$E_{\Omega(n:F)}(A^{A^{NF}}(f))=E_{\Omega(n:F)}(n(f)/p')=w(F)n(f)/n(F).$$

Lemma 9.8. For any two flows $f_1 \neq f_2$, $$\text{cov}(R^{A^{NF}}(f_1),R^{A^{NF}}(f_2)) \leq 0.$$

Proof. It should be shown that $$E(R^{A^{NF}}(f_1)R^{A^{NF}}(f_2)) \leq \rho(f_1)\rho(f_2). \quad \text{(Eq. 28)}$$

By definition $$R^{ANF}(f_1)R^{ANF}(f_2) = \sum_{v_1 \in f_1}\sum_{v_2 \in f_2} R^{ANF}(v_1)R^{ANF}(v_2)$$

$$\rho^{ANF}(f_1)\rho^{ANF}(f_2) = \sum_{v_1 \in f_1}\sum_{v_2 \in f_2} \rho^{ANF}(v_1)\rho^{ANF}(v_2)$$

$$= \sum_{v_1 \in f_1}\sum_{v_2 \in f_2} 1/w(F)^2$$

From linearity of expectation, a sufficient condition for Eq. (28) is that for any $v_1 \in f_1$ and $v_2 \in f_2$, $$E(R^{A^{NF}}(v_1)R^{A^{NF}}(v_2)) \leq 1/w(F)^2. \quad \text{(Eq. 29)}$$

Consider a partition of the sample space according to the induced permutation on the packets $w(F) \setminus \{v_1, v_2\}$. It is shown that Eq. (29) holds within each subspace. Consider such a permutation and define l as follows. If the first k flows in $w(F) \setminus \{v_1, v_2\}$ include both $f_1$ and $f_2$, then l is the position of the first packet of the $(k+1)$st flow. Otherwise, if the first $k-1$ flows include exactly one of $\{f_1, f_2\}$ (observe that the other cannot be the kth flow), then l is the position of the first packet of the kth flow. Otherwise, (the first $k-1$ flows do not include either of $\{f_1, f_2\}$), l is the position of the first packet of the $(k-1)$th flow.

The packets $v_1$ and $v_2$ are both counted (and both are assigned non-zero adjusted selectivities) if and only if they both appear before the l th packet of the induced permutation on $w(F) \setminus \{v_1, v_2\}$, which is equivalent to saying that their positions in the permutation over $w(F)$ is at most $l+1$. This happens with probability $$\frac{l}{w(F)-1}\frac{l+1}{w(F)}.$$

In this case there are $l+1$ counted packets and each packet is assigned adjusted selectivity $1/(l+1)$. Therefore, in this subspace $$E(R^{ANF}(v_1)R^{ANF}(v_2)) = \frac{l(l+1)}{w(F)(w(F)-1)}\frac{1}{(l+1)^2}$$

$$= \frac{1}{w(F)}\frac{l}{l+1}\frac{1}{w(F)-1} \leq \frac{1}{w(F)^2}.$$

(The last inequality follows using $l < w(F)-1$.)

ASH adjusted weights A dominance relation can be used to define the adjusted selectivities for $L \in \{ASH, sSH, sNF\}$. The relation used for adjusted weights emulates an ANF sketch from L's counts and sampling rate (effective sampling rate or sampling rate steps). Correct adjusted selectivities that do not depend on $w(F)$ can be obtained by taking the expectation of the ANF adjusted selectivities over the corresponding subspace of rank assignments.

Done this way, the adjusted selectivities assignment depends on the counts and sampling rate. Better estimators (lower variances) are obtained using an assignment that is based on a coarser partition of the sample space. The assignment depends on $w(F)$ and the counts but not on the sampling rate.

Consider an ASH sketch, let n: F be the ASH counts and let $\Omega^{(n:F)}$ be the probability subspace of all rank assignments with ASH counts n: F.

Lemma 9.9. The following is a correct adjusted selectivities assignment $$R^{ASH}(f) = \frac{1}{w(F)}\left(n(f) + \frac{w(F)-n(F)}{k}\right).$$

$R^{A^{SH}}(f)$ is equal to the expectation of $R^{A^{NF}}(f)$ over $\Omega^{(n:F)}$ and $A^{+ASH}(f)=w(F)R^{A^{SH}}(f)$ is equal to the expectation of $A^{A^{SH}(f) \text{ over }\Omega_{(n:F)}}$ Proof. The packets of F are partitioned into three groups R∪S∪O as follows. R is the set of first-counted packets of the sketched flows ($|R|=k$), S is the set of subsequent counted packets ($|S|=n(F)-k$), and $O=F \setminus S \setminus R$ ($|O|=w(F)-n(F)$) is the set of "uncounted" packets. A particular ASH count (the rank assignment is in $\Omega^{(n:F)}$) is obtained if and only if the permutation over the packets has the property that the packets of R have lower ranks than the packets of O.

The distribution of ANF counts in the subspace $\Omega^{(n:F)}$ is considered. The expectation of $A^{+ANF}(v)$ for all ASH-counted packets is computed. In all rank assignments in $\Omega^{(n:F)}$, the packets of R are counted by ANF and the packets of O are not. A packet from S is counted by ANF if and only if its position in the permutation over F is before all packets of O. The total number of permutations over F that lie in $\Omega^{(n:F)}$ are $$|S|!|R|!|O|! \binom{w(F)}{|R|+|O|} = \frac{k!(w(F)-n(F))!w(F)!}{(w(F)-n(F)+k)!}. \qquad \text{(Eq. 30)}$$

The number of permutations over F with exactly $l \in \{0, \ldots, n(F)-k\}$ ANF-counted packets from S (that is, total of l+k ANF-counted packets) is $$\binom{|S|}{l+k}|O|(|S|-l+|O|-1)! = \binom{n(F)-k}{l}(l+k)!(w(F)-n(F))(w(F)-k-l-1)! \qquad \text{(Eq. 31)}$$

The probability in $\Omega^{(n:f)}$ that exactly l packets from S are counted is the ratio of Eq. (31) and Eq. (30):

$$p_l(w(F), n(F), k) == \frac{\binom{w(F)-}{k-l-1}(n(F)-k)!(l+k)! !(w(F)-n(F)+k)!}{l!(n(F)-k-l)!k!(w(F)-n(F)-1)!w(F)!}$$

Consider the subspace of $\Omega^{(n:F)}$ that includes all permutation such that there are l counted packets from S. The probability that a packet $c \in S$ is ANF-counted is $l/(n(F)-k)$. If counted, it is assigned adjusted selectivity $1/(l+k)$. Therefore, the corresponding ASH-adjusted selectivity of these packets is $$R'^{ASH}(c) = \frac{l}{(n(F)-k)(l+k)}.$$

The probability that a packet $c \in R$ is ANF-counted is 1 and therefore $$R'^{ASH}(c) = \frac{1}{l+k}.$$

Hence, for a flow f, $$R'^{ASH}(f) = \sum_{l=0}^{n(F)-k} p_l(w(F), n(F), k) \frac{n(F)-k+l(n(f)-1)}{(n(F)-k)(l+k)}.$$

The equality $R'^{ASH}(f) \equiv R^{ASH}(f)$ follows by standard manipulations.

The expectation $A'^{A^{SH}}(f)$ of $A^{A^{SH}}(f)$ over this subspace is next considered. Consider the subspace of all permutation such that there are l counted packets from S. The distribution of the inverse sampling rate is that of the (k+l+1) smallest of w(F) independent random variables from U[0,1]. The expectation is therefore $w(F)/(k+l)$ and the expectation of $A^{A^{SH}}(f)$ is $n(f)-1+w(F)/(k+l)$. Therefore, $$A'^{ASH}(f) = \sum_{l=0}^{n(F)-k} p_l(w(F), n(F), k)\left(n(f) - 1 + \frac{w(F)}{(k+l)}\right).$$

The relation $A'^{A^{SH}}(f) \equiv A^{+A^{SH}}(f)$ follows by standard manipulations.

The intuition for this expression is to view the process as the packets in $O \cup R$ being subjected to uniform sampling of k packets, and therefore, each packet obtains an adjusted selectivity of 1/k (in $R \cup O$) and adjusted weight of $|O \cup R|/k$ and selecting all packets in S and therefore each packet obtains an adjusted selectivity of 1/|S| (in S) and adjusted weight of 1. Therefore, $n(f)-1+|O \cup R|/k$ are adjusted weights for f.

It follows from Lemma 9.9 and Lemma 9.4 that $\text{VAR}(A^{+A^{SH}}(f)) \leq \text{VAR}(A^{A^{SH}}(f))$ and $\text{VAR}(A^{+ASH}(f)) \leq \text{VAR}(A^{ANF}(f))$ for all $f \in F$. Using a similar proof to Lemma 9.8 it can be shown that for all $f_1 \neq f_2$, $$\text{cov}(A^{+A^{SH}}(f_1), A^{+A^{SH}}(f_2)) \leq 0.$$

Adjusted count and FSD ASH estimators. The expectation of the inverse sampling rate over $\Omega^{(n:F)}$ is $$\sum_{l=0}^{n(F)-k} p_l(w(F), n(F), k) w(F)/(k+l) = \frac{w(F)-n(F)+k}{k}.$$

The ASH adjusted counts and FSD estimators depend on the counts and linearly on 1/p. Their expectation over $\Omega^{(n:F)}$ constitutes a tighter unbiased estimator. This expectation is obtained by replacing 1/p with its expectation $$\frac{w(F)-n(F)+k}{k}.$$

10 Additional Observations and Embodiments

Accurate summarization of IP traffic is essential for many network operations. The present invention provides summarization algorithms that generate a sketch of the packet streams that allows processing of approximate subpopulation size queries and other aggregates. The algorithms build on existing designs, but are yet able to obtain significantly better estimates through better utilization of available resources and careful derivation of unbiased statistical estimators that have minimum variance with respect to the information they use.

A system and computer-readable medium in accordance with the present invention, which incorporate at least some of the preferred features, is intended to be within the scope of the present invention. The system may be implemented using at least one of a microprocessor, a microcontroller, programmable logic, and/or an application specific integrated circuit (ASIC) with or without software and/or firmware. The computer-readable medium may include a compact disc (CD), digital video disc (DVD), and/or tape, which include instructions that when executed by at least one computing device performs the methods in accordance with the present invention.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

The following references are referred to above and incorporated herein by reference:

[1] E. Cohen. Size-estimation framework with applications to transitive closure and reachability. *J. Comput. System Sci.*, 55:441-453, 1997.

[2] E. Cohen, N. Duffield, H. Kaplan, C. Lund, and M. Thorup. Algorithms and estimators for accurate summarization of Internet traffic. In *Proceedings of the 7th ACM SIGCOMM conference on Internet measurement (IMC)*, 2007.

[3] E. Cohen, N. Duffield, H. Kaplan, C. Lund, and M. Thorup. Sketching unaggregated data streams for subpopulation-size queries. In *Proc. of the 2007 ACM Symp. on Principles of Database Systems (PODS 2007)*. ACM, 2007.

[4] E. Cohen and H. Kaplan. Bottom-k sketches: Better and more efficient estimation of aggregates. In *Proceedings of the ACM SIGMETRICS 07 Conference*, 2007. poster.

[5] E. Cohen and H. Kaplan. Sketches and estimators for subpopulation weight queries. Manuscript, 2007.

[6] E. Cohen and H. Kaplan. Spatially-decaying aggregation over a network: model and algorithms. *J. Comput. System Sci.*, 73:265 288, 2007.

[7] E. Cohen and H. Kaplan. Summarizing data using bottom-k sketches. In *Proceedings of the ACM PODC 07 Conference*, 2007.

[8] C. Cranor, T. Johnson, V. Shkapenyuk, and O. Spatcheck. Gigascope: A stream database for network applications. In *Proceedings of the ACM SIGMOD*, 2003.

[9] N. Duffield, C. Lund, and M. Thorup. Estimating flow distributions from sampled flow statistics. In *Proceedings of the ACM SIGCOMM 03 Conference*, pages 325 336, 2003.

[10] N. Duffield, M. Thorup, and C. Lund. Flow sampling under hard resource constraints. In *Proceedings the ACM IFIP Conference on Measurement and Modeling of Computer Systems (SIGMETRICS/Performance)*, pages 85 96, 2004.

[11] C. Estan, K. Keys, D. Moore, and G. Varghese. Building a better netflow. In *Proceedings of the ACM SIGCOMM 04 Conference*. ACM, 2004.

[12] C. Estan and G. Varghese. New directions in traffic measurement and accounting. In *Proceedings of the ACM SIGCOMM 02 Conference*. ACM, 2002.

[13] P. Gibbons and Y. Matias. New sampling-based summary statistics for improving approximate query answers. In *SIGMOD*. ACM, 1998.

[14] J. M. Hellerstein, P. J. Haas, and H. J. Wang. Online aggregation. In *Proceedings of the ACM SIGMOD*, 1997.

[15] N. Hohn and D. Veitch. Inverting sampled traffic. In *Proceedings of the 3rd ACM SIGCOMM conference on Internet measurement*, pages 222 233, 2003.

[16] K. Keys, D. Moore, and C. Estan. A robust system for accurate real-time summaries of Internet traf c. In *Proceedings of the ACM SIGMETRICS 05*. ACM, 2005.

[17] A. Kumar, M. Sung, J. Xu, and E. W. Zegura. A data streaming algorithm for estimating subpopulation flow size distribution. *ACM SIGMETRICS Performance Evaluation Review*, 33, 2005.

[18] S. Ramabhadran and G. Varghese. Efficient implementation of a statistics counter architecture. In *Proc. of ACM Sigmetrics 2003*, 2003.

[19] B. Ribeiro, D. Towsley, T. Ye, and J. Bolot. Fisher information of sampled packets: an application to flow size estimation. In *Proceedings of the 2006 Internet Measurement Conference*. ACM, 2006.

[20] D. Shah, S. Iyer, B. Prabhakar, and N. McKeown. Maintaining statistics counters in router line cards. *IEEE Micro*, 22(1):76 81, 2002.

[21] M. Szegedy and M. Thorup. On the variance of subset sum estimation. In *Proc. 15th ESA*, 2007.

[22] E. Cohen, N. Duffield, H. Kaplan, M. Thorup and C. Lund. Algorithms and estimators for summarization of unaggregated data streams. Sep. 10, 2007.

What is claimed is:

1. A computer-readable storage medium comprising instructions that, when executed by a computing device, cause the device to:

aggregate sampled packets in accordance with a flow associated with the sampled packets, the packets being sampled from the packet stream at a sampling rate;

count the aggregated packets using Adaptive Sample-and-Hold (aSH);

adjust the sampling rate based on a quantity of flows to obtain a sketch having a predetermined size, the sampling rate being adjusted in steps; and transfer the count of aggregated packets from SRAM to DRAM, initialize the count in SRAM following adjustment of the sampling rate; and calculate an adjusted weight of each flow using:

$$A^{sSH}(n) = \frac{(1-p_1) + \sum_{i=1}^{r} n_i \left(1 - \sum_{h=1}^{i} c_{h,h}\right)}{1 - \sum_{h=1}^{r} c_{h,h}}$$

r being a total quantity of steps, $n=(n_1, \ldots, n_r)$ such that $n_i$ is the number of packets counted from the flow in step i, and $c_{h,h}(h=1, \ldots, r)$ are defined by:

$c_{1,j}=(1-p_j)$ for $1 \leq j \leq r$, $c_{2,j}=(1-p_j)^{n_1-1}(c_{1,j}-c_{1,1})$ for $2 \leq j \leq r$, $c_{i,j}=(1-p_j)^{n_1-1}(c_{i-1,j}-c_{i-1,i-1})$ for $3 \leq i \leq j \leq r$, $p_1 > \ldots > p_r$ is the sampling rate at step $i=1, \ldots r$, the adjusted weight of the flow representing an estimate of the size of the flow.

2. The computer-readable storage medium of claim 1, further comprising instructions that, when executed by a computing device, cause the device to: sum the adjusted weights of each flow in a subpopulation of flows to obtain a size of the subpopulation of flows.

3. The computer-readable storage medium of claim 2, wherein the subpopulation of flows is associated with at least one of a protocol, source, and application.

4. The computer-readable storage medium of claim 1, further comprising instructions that, when executed by a computing device, cause the device to: sample all packets at a fixed rate $p_{base}$ to obtain a $p_{base}$-sampled stream to reduce the packet stream before aggregating and counting.

5. The computer-readable storage medium of claim 1, further comprising instructions that, when executed by a computing device, cause the device to: decrease the sampling rate in response to i) a quantity of cached flows being equal to a maximum quantity of cached flows, and ii) a sampled packet not being associated with a cached flow, using three tunable parameters $\mu$, $p_{start}$ and $p_{base}$, wherein $0<\mu<1$, $p_{base} \leq 1$ and $p_{start} \leq p_{base}$ and sampling rates are of the form $(p_{start}/p_{base}) \mu^t$ where t is a nonnegative integer.

6. The computer-readable storage medium of claim 5, further comprising instructions that, when executed by a computing device, cause the device to: calculate an adjusted weight of a flow using:

$$A^{sSH}(n) = \frac{(1-p_1) + \sum_{i=1}^{r} n_i \left(1 - \sum_{h=1}^{i} c_{h,h}\right)}{1 - \sum_{h=1}^{r} c_{h,h}}$$

r being a total quantity of steps,
$n=(n_1, \ldots, n_r)$ such that $n_i$ is the number of packets counted from the flow in step i, and $c_{h,h}(h=1, \ldots, r)$ are defined by:
$c_{1,j}=(1-p_j)$ for $1 \leq j \leq r$,
$c_{2,j}=(1-p_j)^{n_1-1}(c_{1,j}-c_{1,1})$ for $2 \leq j \leq r$,
$c_{i,j}=(1-p_j)^{n_i-1}(c_{i-1,j}-c_{i-1,i-1})$ for $3 \leq i \leq j \leq r$,
$p_1 > \ldots > p_r$ is the sampling rate at step $i=1, \ldots r$,.

7. A computer-readable storage medium comprising instructions that, when executed by a computing device, cause the device to:
aggregate sampled packets in accordance with a flow associated with the sampled packets, the packets being sampled from the packet stream at a sampling rate;
count the aggregated packets using Adaptive Sample-and-Hold (aSH);
adjust the sampling rate based on a count of the aggregated packets to obtain a sketch having a predetermined size, the sampling rate being adjusted in steps;
transfer the count of aggregated packets from SRAM to DRAM;
initialize the count in SRAM following adjustment of the sampling rate; and
calculate the unbiased estimate $\alpha_i^{sSH}(p,n)$, p being a sampling rate vector for a flow with count vector n and $$0 < i \leq \sum_{h=1}^{r} n_h,$$

wherein if $|n| = 1$ then $\alpha_1^{sSH}(p,n) = 1/p_r$, if $n_r = |n| > 1$ then $\alpha_{|n|}^{sSH}(p,n) = 1/p_r$ and $\alpha_{|n|-1}^{sSH}(p,n) = -(1-p_r)/p_r$, for $l = 3, \ldots, r-1$, for $l = 2$ if $n_1 > 1$, and for $l = n_r > 0$ then:

$$\alpha_{\sum_{h=l}^{r} n_h}^{sSH}(p,n) = \frac{-c_{l,l}}{q^{sSH}[n \mid n]}$$

if $n_1 = 1$, then $\alpha_{\sum_{l=2}^{r} n_h}^{sSH}(p,n) = \frac{-(1-p_2)}{q^{sSH}[n \mid n]}$ if $n_1 > 1$, then $\alpha_{-1+\sum_{h=1}^{r} n_h}^{sSH}(p,n) = \frac{-(1-p_1)}{q^{sSH}[n \mid n]}$ $\alpha_{\sum_{h=1}^{r} n_h}^{sSH} = \frac{1}{q^{sSH}[n \mid n]}$ and $q^{sSH}[n \mid n] = 1 - \sum_{h=1}^{r} c_{h,h}$ wherein
$c_{h,h}(h = 1, \ldots, r)$ is defined by:

$c_{1,j} = (1-p_j)$ for $1 \leq j \leq r$ $c_{2,j} = (1-p_j)^{n_1-1}(c_{1,j}-c_{1,1})$ for $2 \leq j \leq r$ $c_{i,j} = (1-p_j)^{n_i-1}(c_{i-1,j}-c_{i-1,i-1})$ for $\leq i \leq j \leq r$.

8. The computer-readable storage medium of claim 7, wherein the flows of size i belong to one subpopulation of flows.

9. A computer-readable storage medium comprising instructions that, when executed by a computing device, cause the device to:
aggregate sampled packets in accordance with a flow associated with the sampled packets, the packets being sampled from the packet stream at a sampling rate;
count the aggregated packets using Adaptive NetFlow (aNF);
adjust the sampling rate based on a quantity of flows to obtain a sketch having a predetermined size, the sampling rate being adjusted in steps;
transfer the count of aggregated packets from SRAM to DRAM;
initialize the count in SRAM following adjustment of the sampling rate; and
calculate an adjusted weight of cached flows using the count of aggregated packets,
wherein the adjusted weight of each flow is calculated using:

$$A^{sNF}[n] = \frac{\sum_{j=1}^{r} \frac{n_j}{p_j} \left(\prod_{h=1}^{r} p_h^{n_h} - \sum_{l=2}^{j} d_{l,l}\right)}{\prod_{h=1}^{r} p_h^{n_h} - \sum_{j=2}^{r} d_{j,j}}$$

$d_{i,j}(p,n)(2 < i < j < r)$ are defined as follows.

$2 \leq j \leq r$: $d_{2,j} = \left(\frac{p_1 - p_j}{p_1}\right)^{n_1} \prod_{h=1}^{r} p_h^{n_h}$ $3 \leq i \leq j \leq r$: $d_{i,j} = \left(\frac{p_{i-1} - p_j}{p_{i-1}}\right)^{n_i-1}(d_{i-1,j} - d_{i-1,i-1})$ for $2 \leq i \leq j \leq r$, $d_{i,j}(p, n)$ is the probability that all packets of flow n have rank values below the sampling rate at packet arrival time, that the flow is fully counted by sNF until the transition into step i, and that at the beginning of step i, the rank of the flow is at least $p_j$, wherein $p_1, \ldots, p_r$ are steps of the sampling rate and $n_1, \ldots, n_r$ are the corresponding counts of each step.

10. The computer-readable storage medium claim 9, further comprising instructions that, when executed by a computing device, cause the device to: sum the adjusted weight of each flow in a subpopulation of flows to obtain the size of the subpopulation of flows.

11. The computer-readable storage medium method of claim 10, wherein the subpopulation of flows is associated with at least one of a protocol, source, and application.

12. The computer-readable storage medium of claim 9, further comprising instructions that, when executed by a computing device, cause the device to: decrease the sampling rate in response to
   i) a quantity of cached flows being equal to a maximum quantity of cached flows, and
   ii) a sampled packet not being associated with a cached flow, using three tunable parameters $\mu$, $p_{start}$ and $p_{base}$, wherein $0<\mu<1$, $p_{base} \leq 1$ and $p_{start} \leq p_{base}$ and sampling rates are of the form $(p_{start}/p_{base}) \mu^t$ where t is a nonnegative integer.

13. The computer-readable storage medium of claim 12, further comprising instructions that, when executed by a computing device, cause the device to: calculate an adjusted weight using:

$$A^{sNF}[n] = \frac{\sum_{j=1}^{r} \frac{n_j}{p_j} \left( \prod_{h=1}^{r} p_h^{n_h} - \sum_{l=2}^{j} d_{l,l} \right)}{\prod_{h=1}^{r} p_h^{n_h} - \sum_{j=2}^{r} d_{j,j}}$$

r being a quantity of steps, $p_1 > \ldots > p_r$ being corresponding sampling rates, $n_i$ being the number of packets counted from the flow in step i.

* * * * *